US008139443B2

(12) United States Patent
Armstrong

(10) Patent No.: US 8,139,443 B2
(45) Date of Patent: Mar. 20, 2012

(54) UNDERWATER SOUND PROJECTOR SYSTEM AND METHOD OF PRODUCING SAME

(75) Inventor: Bruce Allan Armstrong, Dartmouth (CA)

(73) Assignee: Ultra Electronics Canada Defence, Inc., Dartmouth, Nova Scotia (CA)

(*) Notice: Subject to any disclaimer, the term of this patent is extended or adjusted under 35 U.S.C. 154(b) by 753 days.

(21) Appl. No.: 11/794,771

(22) PCT Filed: Dec. 23, 2005

(86) PCT No.: PCT/CA2005/001973

§ 371 (c)(1),
(2), (4) Date: Dec. 26, 2008

(87) PCT Pub. No.: WO2006/072163

PCT Pub. Date: Jul. 13, 2006

(65) Prior Publication Data

US 2009/0268554 A1 Oct. 29, 2009

(51) Int. Cl.
*H04B 11/00* (2006.01)

(52) U.S. Cl. .......................................................... 367/153

(58) Field of Classification Search ................... 367/153
See application file for complete search history.

(56) References Cited

U.S. PATENT DOCUMENTS

| | | | | |
|---|---|---|---|---|
| 2,396,222 | A * | 3/1946 | Foldy | 367/129 |
| 3,182,284 | A * | 5/1965 | Green | 367/155 |
| 4,051,455 | A | 9/1977 | Fowler | |
| 4,268,912 | A * | 5/1981 | Congdon | 367/163 |
| 4,524,693 | A | 6/1985 | McMahon et al. | |
| 4,529,906 | A | 7/1985 | McMahon | |
| 4,633,119 | A * | 12/1986 | Thompson | 367/157 |
| 4,932,007 | A | 6/1990 | Suomala | |
| 5,956,293 | A | 9/1999 | Rorick | |
| 6,683,819 | B1 | 1/2004 | Estaphan et al. | |
| 2009/0268554 | A1* | 10/2009 | Armstrong | 367/131 |

FOREIGN PATENT DOCUMENTS

| | | |
|---|---|---|
| CA | 2260787 | 12/1998 |
| CA | 2319633 | 3/2001 |

OTHER PUBLICATIONS

"Diagnosis and Cure of Erratic Velocity Distributions in Sonar Projector Arrays", David L. Carson, The Journal of the Acoustical Society of America, vol. 34, Nov. 9, Sep. 1962, pp. 1191-1196.

"Interactions in Ring-Shell Projector Arrays", G. W. McMahan, National Defence Research and Development Branch, Jun. 1984.

"Physics of array element interaction phenomena", Dr. Roger T. Richards, et al., Power Transducers for Sonics and Ultrasonics, Springer-Velag Berlin Heidelberg, 1991, pp. 86-108.

(Continued)

*Primary Examiner* — Daniel Pihulic

(74) *Attorney, Agent, or Firm* — Stetina Brunda Garred & Brucker

(57) ABSTRACT

An underwater sound projector system comprises multiple sound projectors, each sound projector being capable of producing acoustic pressures. The sound projectors are held in close proximity such that the sound projectors interact with one another via the acoustic pressures produced. In embodiments, the number and/or spacing of the sound projectors are adjusted based on target performance parameters.

34 Claims, 17 Drawing Sheets

OTHER PUBLICATIONS

"Velocity Control and Electromechanical Feedback in Sonar Projector Arrays. Author Ralph S. Woollett", Ralph S. Woollett, Naval Underwater Systems Center, Apr. 26, 1982.

"Flexure Mode Piezoelectric Transducers" (Germano, IEEE transactions on Audio and Electroacoustics, vol. AU-19, No. 1, Mar. 1971).

"Fundamentals of Acoustics", Fourth Edition, Kinsler, Frey, Coppens and Sanders, pp. 184-187 and 390-392, 2000.

"An Introduction to the Theory and Design of Sonar Transducers", Wilson, Oscar Bryan, pp. 11-15, Jun. 1985.

"A modal Pritchard approximation for computing array element mutual impedance" Scandrett, Day and Baker, Acoustical Society of America, J. Acoust. Soc. Am. 109 (6), Jun. 2001.

* cited by examiner

UNDERWATER SOUND PROJECTOR SYSTEM AND METHOD OF PRODUCING SAME

The present invention relates to an underwater sound projector system and method of producing same, and more particularly to an underwater sound projector system that uses a plurality of small sound projectors in close proximity to achieve superior performance compared to one larger projector.

BACKGROUND OF THE INVENTION

Sound projectors are required in many sonar and underwater research applications. For each application, there is a specification that the sound projector must meet. Some important aspects of the specification are acoustic power within a frequency range, maximum operating depth, cavitation depth, electroacoustic efficiency, shape, weight, and cost.

The acoustic performance of a prior-art sound projector is fixed at the time the projector is designed. If this performance exceeds the specification, the projector will be heavier and larger than it needs to be. Furthermore, if this projector is part of a towed system, the tow body and its handling system should also be larger and stronger, all of which add to purchase and operating costs. On the other hand, if the performance of the projector does not meet the specification, one must either sacrifice a portion of the specification, or embark upon a time-consuming and costly redesign of the projector, if indeed a single projector can be made to meet the specification. The major shortcoming of the prior-art sound projectors in either case is that once built, the performance of an individual projector is fixed.

SUMMARY OF THE INVENTION

The invention disclosed herein addresses this shortcoming of fixed performance by revealing how a plurality of fixed-performance projectors in close proximity can produce a projector system whose acoustic performance and physical attributes can be chosen within wide limits by the system designer. Such a Modular Projector System is referred to as a MPS hereinafter.

In accordance with an aspect of the invention, there is provided a method for producing an underwater sound projector system. The method comprises the steps of providing multiple sound projectors, each sound projector being capable of producing acoustic pressures; and holding the sound projectors in close proximity such that the sound projectors interact with one another via the acoustic pressures that the projectors produce.

In accordance with another aspect of the invention, there is provided an underwater sound projector system comprising multiple sound projectors capable of producing acoustic pressures; and means for holding the sound projectors in close proximity such that the sound projectors interact with one another via the acoustic pressures that the projectors produce.

This summary of the invention does not necessarily describe all features of the invention.

BRIEF DESCRIPTION OF DRAWINGS

These and other features of the invention will become more apparent from the following description in which reference is made to the appended drawings wherein.

DESCRIPTION OF EMBODIMENTS OF THE INVENTION

The key concept behind a MPS is that projectors in close proximity strongly interact with one another via the acoustic pressures they generate. These acoustic interactions increase the radiation impedance (resistance and reactance) felt by each projector. An increase in resistance increases bandwidth and efficiency. An increase in reactance decreases the resonance frequency. As will be shown hereinafter, the magnitude of the increase of radiation impedance is determined by the number and proximity of projectors. It is this ability to choose the radiation resistance and reactance by choosing the number and spacing of projectors that enables adjustable-performance projector systems to be assembled, in a preferred embodiment, from substantially identical, fixed-performance projectors.

In a MPS, owing to the close proximity of the projectors, the system designer can choose the resonance frequency (can be lowered by nearly 3 octaves compared to the resonance of an individual projector), source level (can be increased by greater than 15 dB at the MPS resonance compared, to an individual projector at its resonance), cavitation depth (as shallow as desired), electroacoustic efficiency, and/or bandwidth.

Furthermore, compared to a single, larger projector, a MPS has greater operating depth without pressure compensation, costs less, weighs less, is smaller, costs less to repair, is more reliable, and/or provides some freedom in system shape.

In the prior art, numerous projector designs are required to cover these ranges of parameters, whereas a MPS may use only one projector design. The use of a single projector design to replace numerous designs lessens the cost of manufacture, the time to manufacture, and the cost of material in inventory.

The ideal projector for a MPS is small, inexpensive, reliable, lightweight, has a shape that enables close packing, and has good acoustic performance. A well-designed flexural plate (bender) projector fits this description. Benders have been known in the prior art for many years. The principles of operation of benders can be read about in the report entitled "Theory of the Piezoelectric Flexural Disc Transducer with Applications to Underwater Sound" by R. S. Woollett, USL Research Report 490, Dec. 5, 1960, U.S. Navy Underwater Sound Laboratory, New London, Conn.

Although a MPS can be built from any type of projector and the projectors need not be identical, embodiments of the invention will be described herein assuming that substantially identical benders are used. In particular, all subsequent references to "bender" in this disclosure will refer specifically to the bender shown in FIG. 1

Figure 1A:
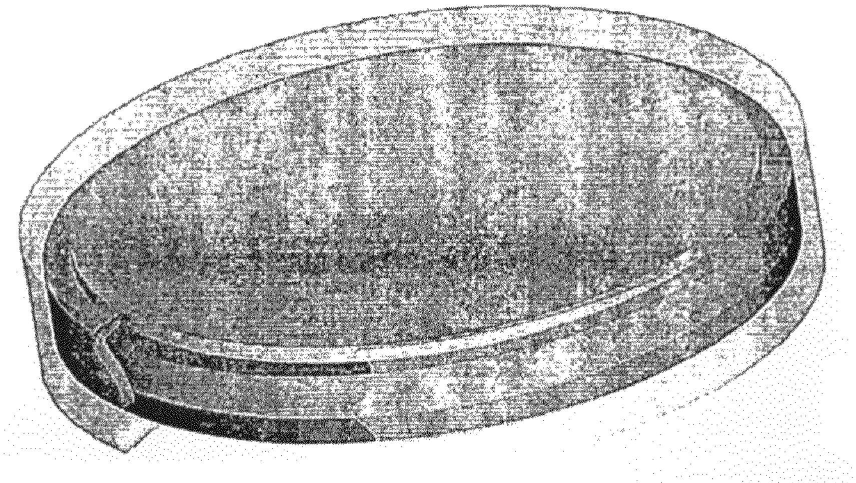
FIG. 1A is a diagram showing an isometric of a bender.
Figure 1B:
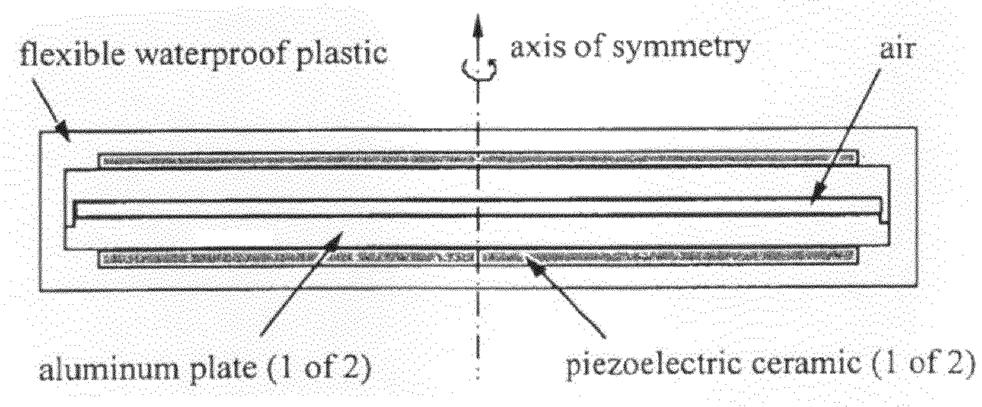
FIG. 1B is a diagram showing a cross-sectional view of the bender shown in FIG. 1A.

The bender in FIG. 1 comprises two circular piezoelectric ceramic plates affixed, one each, to two aluminum plates. The plates are held together at their perimeters in a way that permits each plate to bend freely. The height of the air-filled gap between the plates is just great enough to prevent the plates from touching at maximum depth and vibration amplitude. The assembly is encased in a flexible potting plastic that electrically insulates the assembly from water, but does not substantially restrict plate vibrations. One electrical connection is made to the aluminum plates; the second electrical connection is made to the exposed flat surfaces of the ceramics. The electrical wires that make these connections are not shown.

In another embodiment, the bender assembly is not potted. Rather, all benders in the MPS are immersed in an electrically insulating fluid such as oil, which is contained in a flexible plastic hose or other flexible container.

The bender shown in FIG. 1 has been tested at full power at resonance at a depth of 250 m. Some specifications for this bender are listed in Table 1.

TABLE 1

| Measured performance of the bender | |
|---|---|
| Resonance frequency in water (Hz) | 1738 |
| TVR at resonance (dB re 1 μPa at 1 m per volt) | 136.8 |
| Conservative maximum drive voltage ($V_{rms}$) | 1,000 |
| Cavitation depth for a source level of 198 dB re 1 μPa at 1 m at resonance (m) | 49 |
| Diameter with potting (mm) | 106 |
| Thickness with potting (mm) | 20 |
| Mass with potting (gram) | 500 |
| Depth limit at maximum drive (m) | >250 |

Figure 2A:
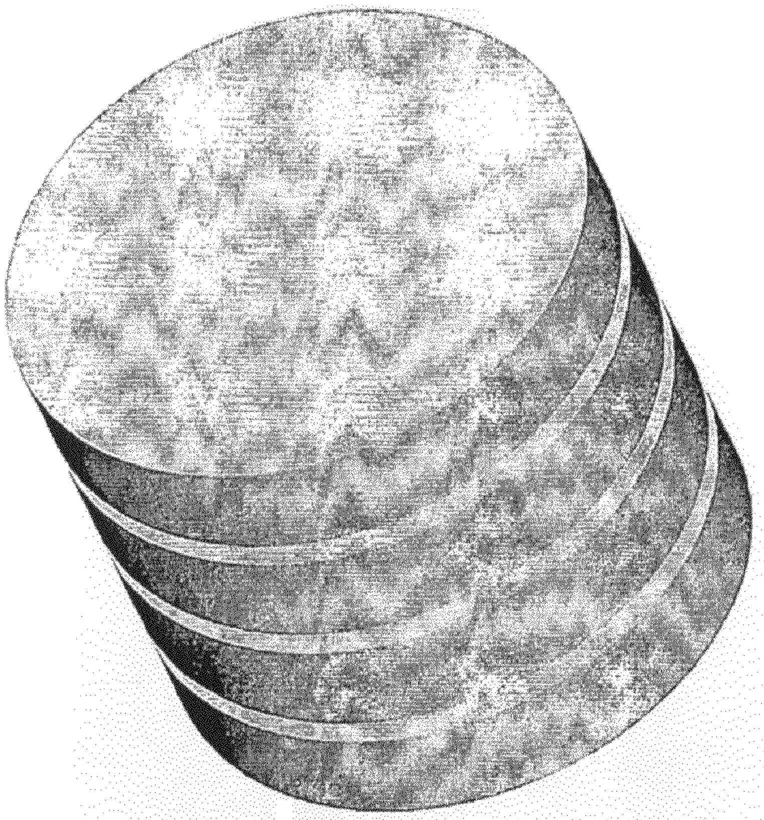
FIG. 2A is a diagram showing an isometric view of a 4-25 MPS.
Figure 2B:
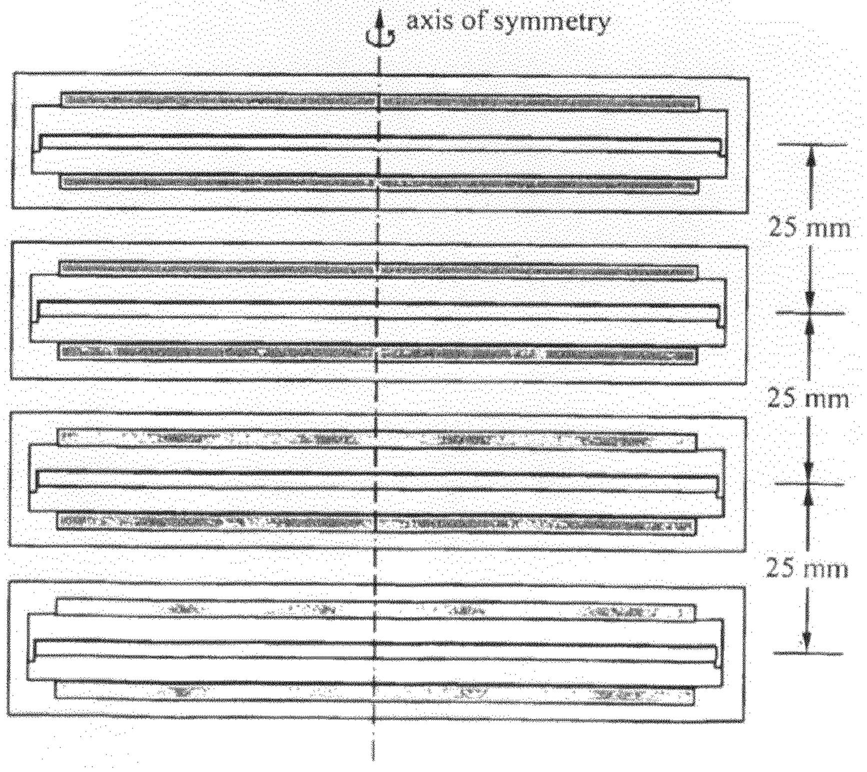
FIG. 2B is a diagram showing a cross-sectional views of the 4-25 MPS shown in FIG. 2A.

FIG. 2 is an example of a MPS that comprises four benders aligned axially with a center-to-center spacing of 25 mm between projectors. This is a 4-25 MPS in the nomenclature used herein (the number of projectors)-(the spacing between projectors). The resonance frequency of this 4-25 MPS is 1146 Hz, which is about ⅓ less than the 1738-Hz resonance of a single bender in the free field. Furthermore, the output power of this MPS at the 1146-Hz resonance is 2.4 times greater than the power of a single projector at 1738 Hz, and the mechanical Q is 9% less.

Figure 3:
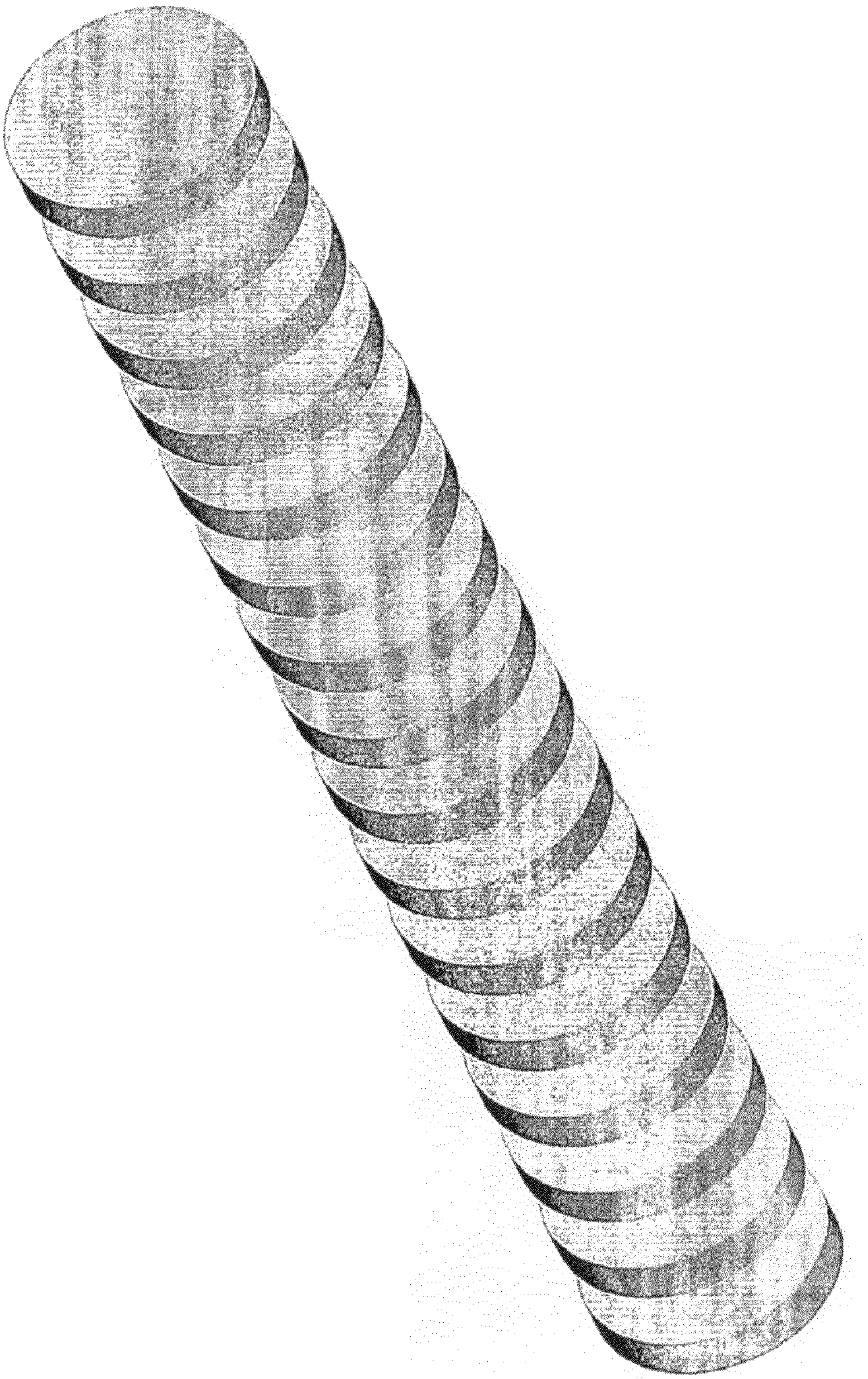
FIG. 3 is a diagram showing an isometric view of a 16-50 MPS.

FIG. 3 is another example of a MPS that comprises 16 benders aligned axially with a center-to-center spacing of 50 mm. This 16-50 MPS has a resonance of 1200 Hz, which is near the resonance of the 4-25, but owing to the greater radiating area, has a lesser cavitation depth and greater bandwidth as well as other advantages that are described hereinafter.

Figure 4:
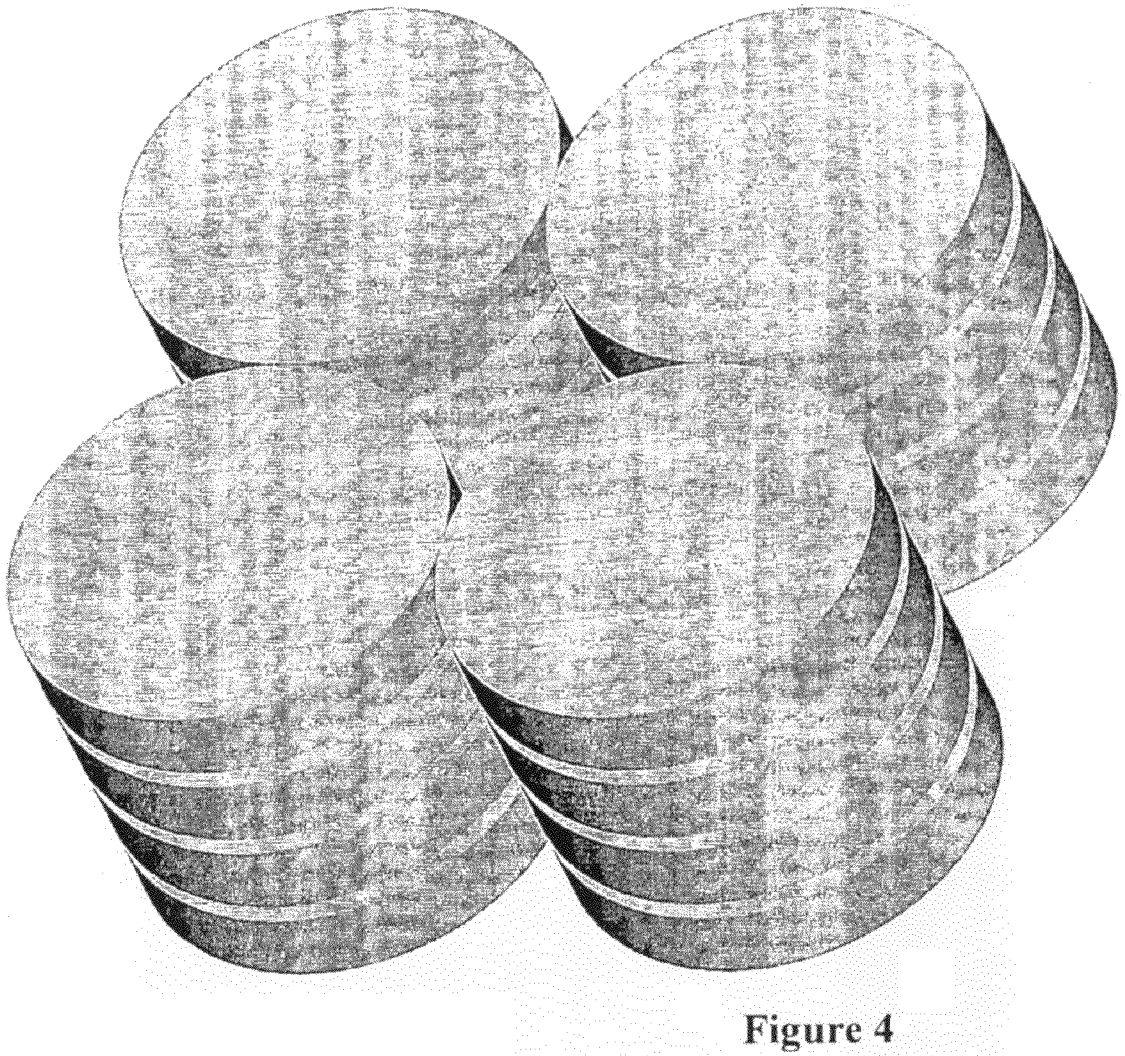
FIG. 4 is a diagram showing an isometric view of a 4×4-25 MPS.

FIG. 4 is another example of a MPS that comprises four stacks with four benders in each stack, with the benders in each stack separated by 25 mm. This 4×4-25 MPS resonates near 750 Hz, has a −3 dB bandwidth exceeding 200 Hz, and can produce acoustic power in excess of 2 kW at resonance.

Figure 5:
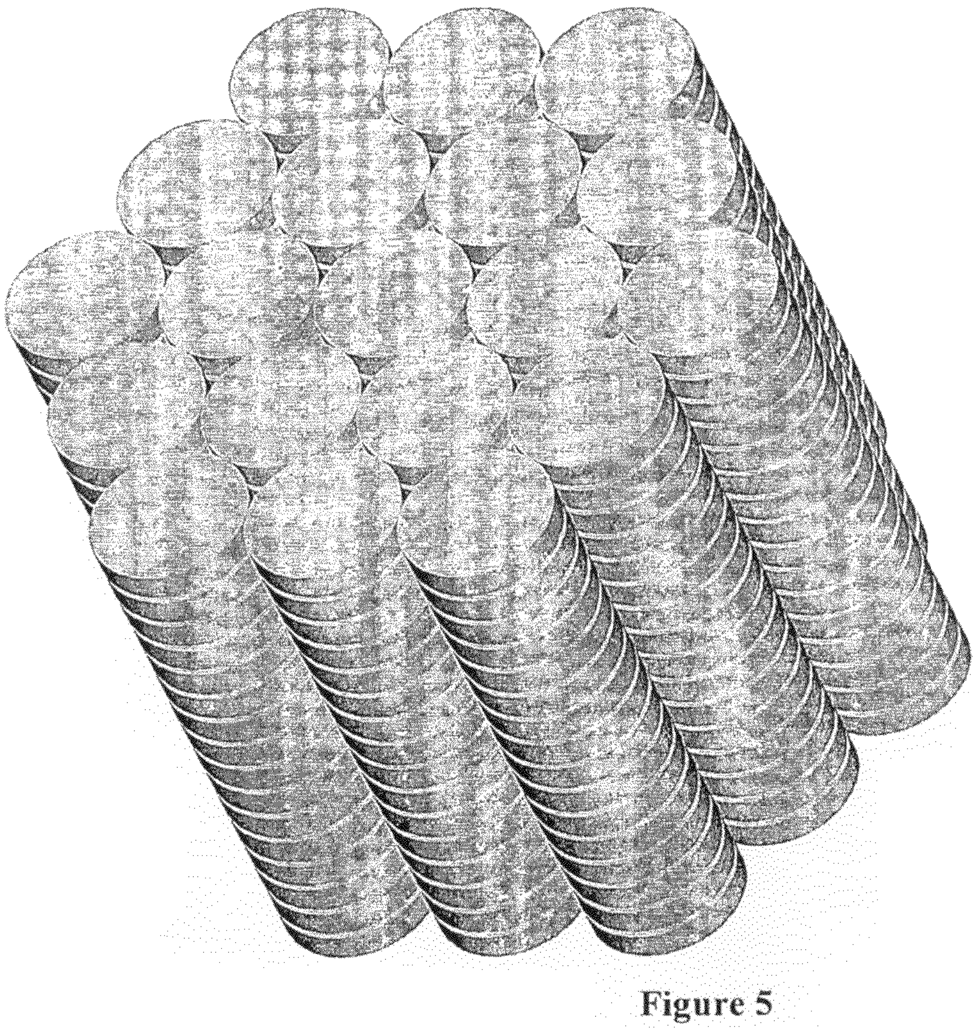
FIG. 5 is a diagram showing an isometric view of a 19×16-25 MPS.

FIG. 5 is another example of a MPS that comprises 19 stacks with 16 benders in each stack, with the benders in each stack separated by 25 mm. This 19×16-25 MPS resonates near 350 Hz, has a −3 dB bandwidth of 113 Hz, and can produce acoustic power in excess of 10 kW at resonance.

Figure 6:
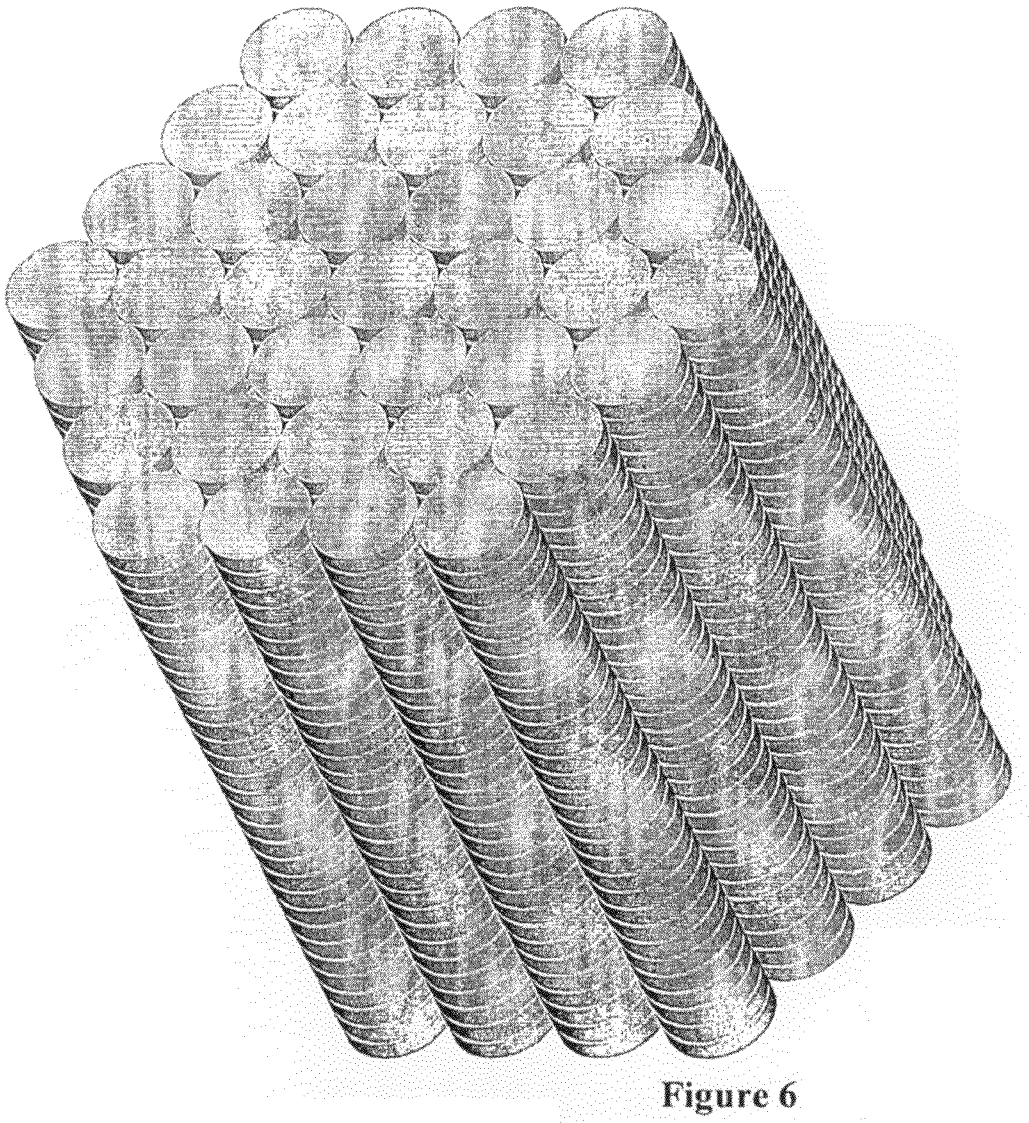
FIG. 6 is a diagram showing an isometric view of a 37×30-25 MPS.

FIG. 6 is another example of a MPS that comprises 37 stacks with 30 benders in each stack, with the benders in each stack separated by 25 mm. This 37×30-25 MPS is capable of producing substantial power at low frequencies and is small, light, and reliable compared to prior-art projectors operating in the same frequency range. Furthermore, this or any other MPS, does not require depth compensation at depths up to 250 m.

Figure 7:
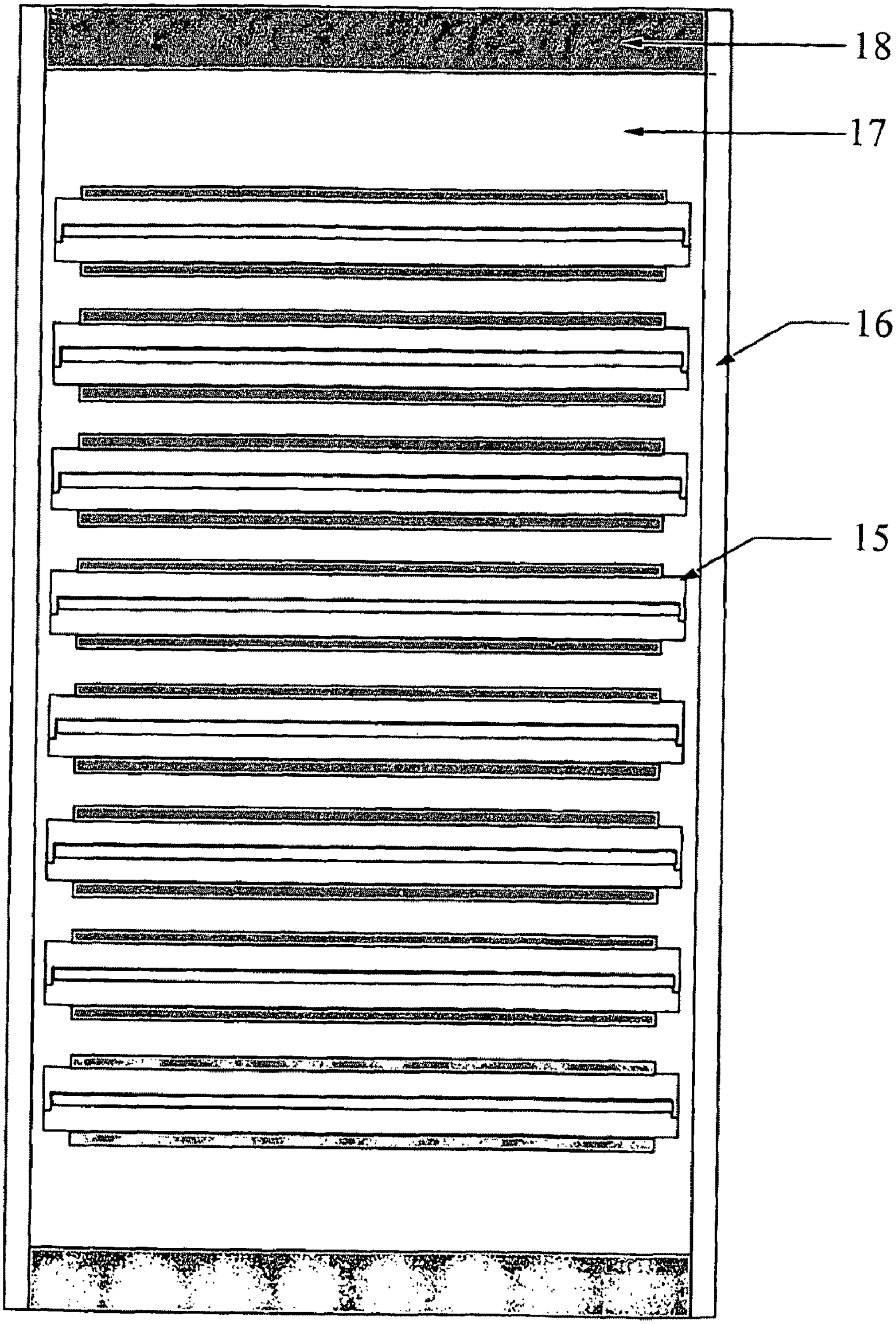
FIG. 7 is a diagram showing an a 8-20 MPS in an oil-filled hose.

FIG. 7 is an example of a MPS that comprises eight unpotted benders 15, immersed in an insulating fluid 17. This fluid is contained within a flexible container such as a plastic or rubber hose 16 that is sealed with two endcaps 18. Benders without potting can be spaced closer together and in this example the separation between benders is 20 mm.

Figure 8:
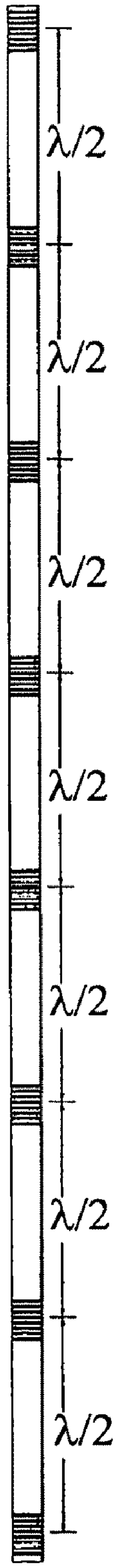
FIG. 8 is a diagram showing an eight 8-20 MPSs in an oil-filled hose, each MPS spaced at ½.

FIG. 8 is an example of a MPS that uses eight 8-20 MPSs in an oil-filled hose. The separation between MPSs is 80 cm, which is near λ/2 at the 930-Hz resonance frequency of the individual 8-20 MPS. In this example, the 8-20 MPS is used to create a MPS with a resonance at about 930 Hz, and the λ/2 spacing of multiple MPSs results in a directional sound source.

Figure 9:
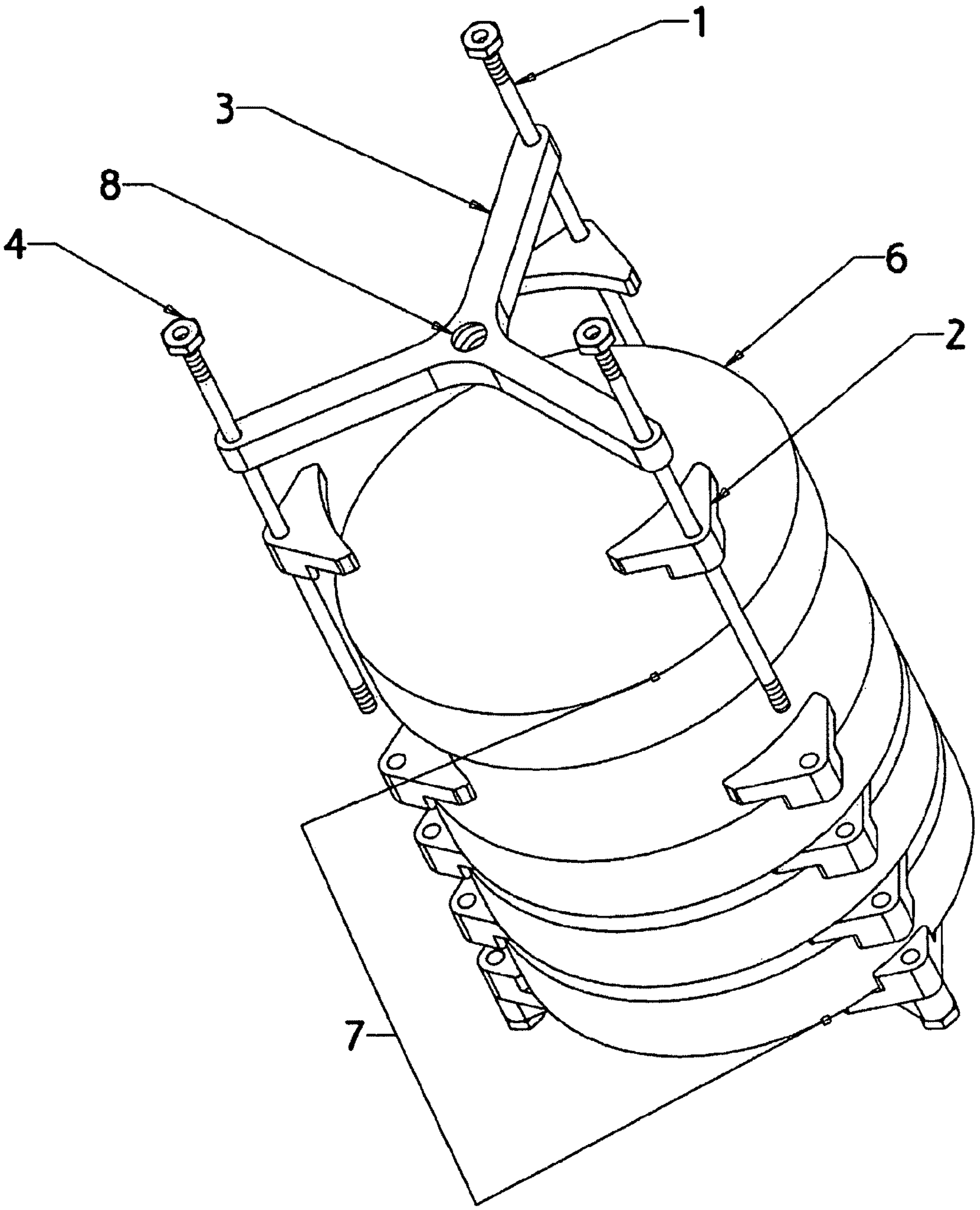
FIG. 9 is a diagram showing means of holding four benders in a stack.
Figure 10:
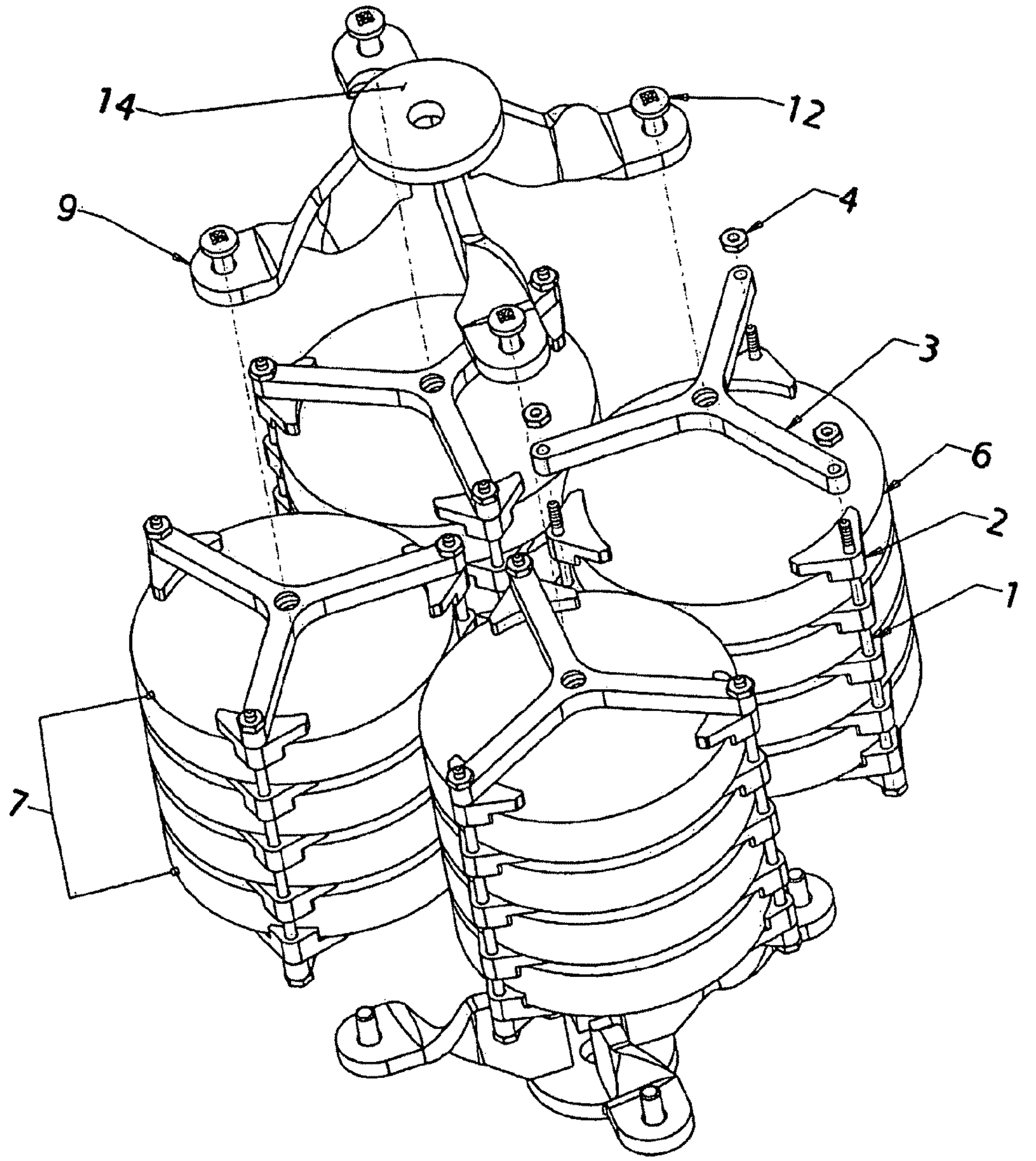
FIG. 10 is a diagram showing means of holding four stacks of benders in a 4×4-25 MPS.

FIG. 9 and FIG. 10 reveal one of many suitable means to assemble a 4-25 stack and to assemble four 4-25 stacks into a 4×4-25 MPS. Stacks of benders may be made with lesser or greater numbers of benders and MPSs may be assembled from lesser or greater numbers of stacks.

FIG. 9 shows how the benders 6 in a 4-25 MPS can be assembled into a stack 7. Three rods 1, threaded at each end, are aligned with their axes parallel to the axis of the bender stack 7. Spacers 2 keep the benders 6 axially separated by the desired distance. The number of spacers 2 and lengths of rods 1 that are required depend on the number of benders 6 in the stack 7. Two stack-ends 3 hold the rods 1 at 120° angular intervals. Six lock nuts 4 clamp the stack assembly. All pieces can be made of metal, preferably non-corroding in salt water, or plastic, or a combination of metal and plastic. The separation between projectors can be altered by using spacers 2 of different height, and rods 1 of different length.

FIG. 10 shows one of many suitable means by which four bender stacks 7 can be assembled into a 4×4-25 MPS. Frames 9 are arranged to pass above and beneath the axes of all stacks 7. Bolts 12 fasten the top and bottom of each stack 7 to the frames 9. A flange 14 on the upper frame 9 can be used to attach the MPS to a tow cable or a tow body.

Those skilled in the art of projector system design will recognize that the means of holding the benders in position should have minimal cross-sectional area while being sufficiently strong to survive operational conditions and preferably should not have a strong resonance in the acoustic band of interest.

The examples presented hereinbefore have revealed that the resonance frequency, the radiated acoustic power and cavitation depth can be chosen within a wide range by choosing the number of benders and the spacing between benders in the MPS. The theory that explains how radiation impedance affects the performance of a projector, and how radiation impedance is affected by nearby projectors is explained immediately hereinafter. This theory explains the concept behind a MPS, but is too simple to provide quantifiable results. For quantifiable results, one needs to use numerical techniques, the results of which are presented after the theory.

The radiation impedance affects projector performance as follows. Electrical equivalent circuits can facilitate the qualitative understanding of mechanical systems. For an understanding of equivalent circuits, refer to "Fundamentals of Acoustics", fourth edition, Kinsler, Frey, Coppens and Sanders, or "Introduction to the Theory and Design of Sonar Transducers", Wilson, Oscar, Bryan. Electrical equivalent circuits will be used herein to show how radiation impedance changes the resonance frequency, electroacoustic efficiency, bandwidth, and output power of a projector. The circuits shown herein are too simple an approximation to produce accurate quantitative results of a real projector, but do illustrate how radiation impedance affects projector performance.

Figure 11:
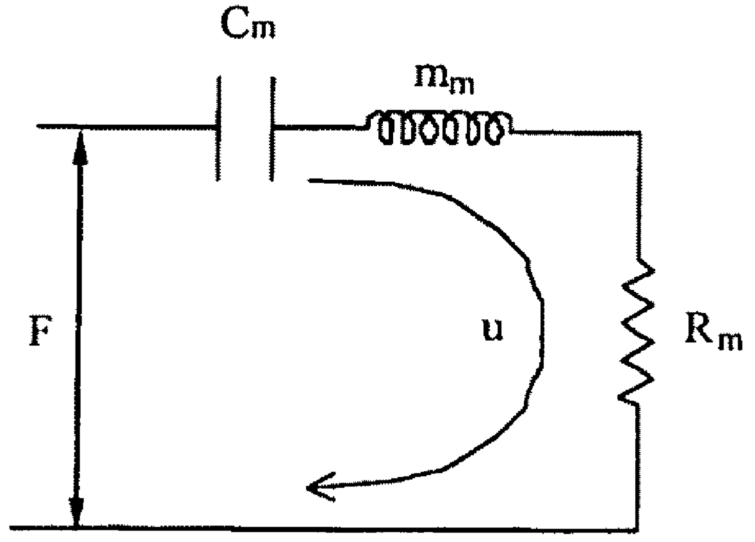
FIG. 11 is a diagram showing an equivalent circuit of an idealized projector in a vacuum.

FIG. 11 is the electrical equivalent circuit of a one-degree-of-freedom mechanical system vibrating in a vacuum. The capacitor, $C_m$, represents the compliance of the mechanical system (projector); the inductor, $m_m$, represents the vibrating mass; the resistor, $R_m$, represents the mechanical loss.

The force, F, (voltage) of angular frequency, ω, acting through the mechanical impedance, $Z_m$, of the LCR circuit produces a velocity, u, (current).

$$F = Z_m u = \left[j\omega m_n - \frac{j}{\omega C_m} + R_m\right]\cdot u$$

The resonance frequency, $\omega_{res}$, of this system is $$\omega_{res} = \sqrt{\frac{1}{m_m C_m}}$$

A mechanical system vibrating underwater produces dynamic pressures in the water that oppose the motion of the vibrating surface. The opposing force can be represented by a radiation impedance, $Z_r$.

$$Z_r = R_r + jX_r$$

Figure 12:
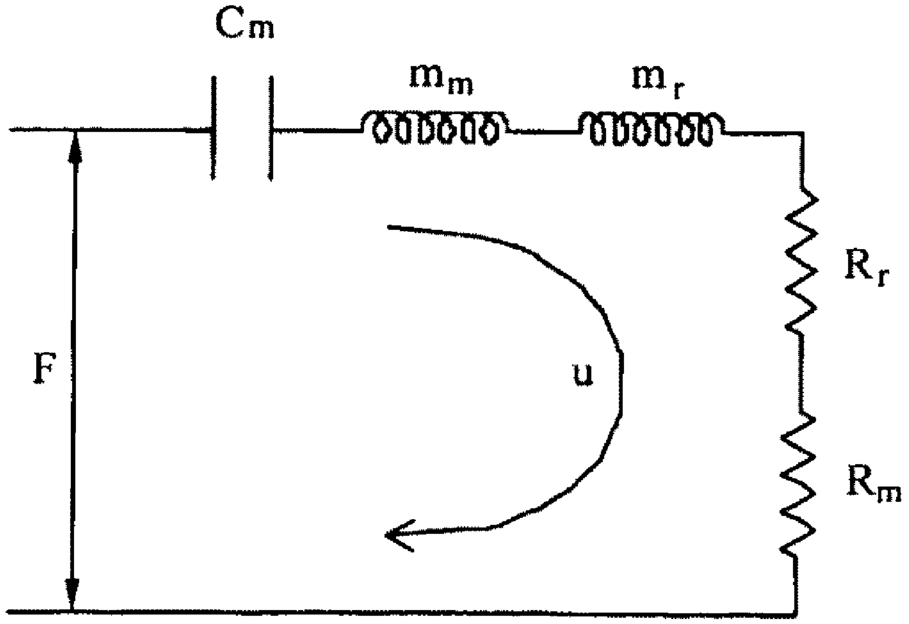
FIG. 12 is a diagram showing an equivalent circuit of an idealized projector vibrating underwater.

$R_r$ represents the component of dynamic pressure that is in phase with the velocity of the vibrating surface. $X_r$ represents the component of pressure that is 90° out of phase with the velocity. $X_r$ is positive for a single projector so its effect is that of a mass, $m_r$. $Z_r$ is in series with the mechanical impedance so the equivalent circuit of a mechanical system vibrating underwater is that shown in FIG. 12.

$$F = (Z_m + Z_r)\cdot u = \left[j\omega(m_n + m_r) - \frac{j}{\omega C_m} + (R_m + R_r)\right]\cdot u$$

The resonance frequency of a projector vibrating underwater is $$\omega_{res} = \sqrt{\frac{1}{(m_r + m_m)C_m}} \quad (1)$$

The power dissipated in $R_r$ equals the radiated acoustic power, Π

$$\Pi = \frac{1}{2}R_r\cdot u^2 \quad (2)$$

The electroacoustic efficiency, η, of the projector is $$\eta = \frac{R_r}{R_r + R_m} \quad (3)$$

The mechanical Q of the projector is approximately $$Q \approx \frac{\omega_{res}(m_r + m_m)}{R_r + R_m} \quad (4)$$

Equations 1, 2, 3, and 4 show the influence that radiation impedance has on acoustic performance. The next section examines the radiation impedance of an idealized system and explains how projectors in near proximity affect each other's radiation impedance.

Acoustic interactions affect radiation impedance as follows. The radiation impedance of most projectors cannot be calculated analytically, but certain ideal projectors can be analyzed, one such geometry being a circular piston vibrating in an infinite baffle. This geometry bears similarities to the bender shown in FIG. 1.

Kinsler and Frey in "Fundamentals of Acoustics" (fourth edition, Kinsler, Frey, Coppens and Sanders) on page 185 to 187 calculate that for a circular piston of radius α vibrating in an infinite plane baffle surrounded by a fluid of density $\rho_o$ and speed of sound c, $Z_r$ can be written as $$Z_r = \rho_o cS[R_1(2k\alpha) + X_1(2k\alpha)]$$

where $S=\pi\alpha^2$, the area of the piston, and $k=2\pi/\lambda$, where λ is the wavelength of the acoustic wave. In the low frequency limit (ka<<1) the radiation impedance can be approximated $$R_r \approx \frac{1}{2}\rho_o cS(ka)^2$$

and the radiation reactance becomes $$X_r \approx \frac{8}{3\pi}\rho_o cSka$$

The low frequency reactance is that of a mass $$m_r = \frac{X_r}{\omega} = \rho_o S \frac{8a}{3\pi}$$

Thus the piston appears to be loaded with a cylindrical volume of fluid with cross-sectional area S and effective height ≈0.85a. Note that in the low frequency limit, the mass is independent of frequency, but that the radiation resistance varies as $\omega^2$.

The approximate formulae for $R_r$ and $X_r$ are valid only for ka<<1, but the error in $R_r$ is only 4% and the error in $X_r$ is only 7% for kα=1.

A single projector vibrating underwater produces dynamic (acoustic) pressures that oppose the motion of its vibrating surfaces. This effect is mathematically expressed by the radiation impedance. If other projectors are nearby, then all projectors have to overcome their self-generated dynamic pressure plus the dynamic pressures of the nearby projectors. In other words, the presence of nearby projectors changes the radiation impedance.

Using the concepts presented by Kinsler and Frey on pages 185 and 186, it can be calculated that for simple sources vibrating with the same volume velocity, $R_r$ are proportional to the number of projectors, N, at frequencies up to where kd=1, where d is the greatest distance between projectors. Although it cannot be calculated exactly, $X_r$ is affected strongly only by those projectors whose separation is comparable to the size of the projector.

In a MPS, sound projectors are held in close proximity. In light of the immediately preceding theory, it is possible to quantitatively define "close proximity". There are two components to the definition, each of which must be satisfied to qualify as a MPS.

1. The separation between projectors is less than or equal to the characteristic size of the projector, and in preferred embodiments, is less than one-half the characteristic size. "Separation" is defined as the distance between the center of a projector and the center of its nearest neighbor. The "characteristic size" of an axially-symmetric bender or sphere is the diameter. In other words, characteristic size is a dimension that somehow represents the size of the projector.

2. The projector is small compared to the wavelength of the acoustic wave at the resonance frequency of the system. At a minimum the characteristic size of a projector is less than λ/8. It is known in the prior art to build arrays from multiple projectors that are arranged axially, on a plane, or within a volume. These prior art systems fail to meet either one or both of the components of the definition of "close proximity". On the other hand, Table 2 shows that all examples of MPSs presented herein meet both components of the definition

TABLE 1

Conformance of example MPSs to definition of close proximity

| | Separation measured in terms of characteristic size | Characteristic size measured in wavelengths |
|---|---|---|
| Definition of close proximity | ≦1 | ≦λ/8 |
| 16-100 MPS | 1 | λ/9 |
| 16-50 MPS | 0.5 | λ/25 |
| 2-50 MPS | 0.5 | λ/19 |
| 16-25 MPS | 0.25 | λ/67 |
| 2-25 MPS | 0.25 | λ/43 |

The theory presented hereinbefore is for low frequencies where the projectors and system size are small compared to a wavelength. This theory facilitated an understanding how acoustic performance is related to acoustic impedance, and how projectors in close proximity interact acoustically, but it is inadequate to produce quantitative results. For quantitative results, one needs to use numerical techniques, such as finite element analysis, FEA.

All the FEA data presented herein were produced with the finite element program MAVART, which was developed specifically to model the vibrations and acoustic radiation from piezoelectrically-driven transducers. MAVART has been thoroughly tested in its 25 year existence and has proven time and time again to be accurate. Details on the accuracy of MAVART can be found in "Comparing Predictive methods for a Ring Projector", Proc IOA, Vol 17-Part3: 44-53, (1995), Bonin, Y., Gallagher, A., Purcell C., and Hardie, D; "Comparing British, French and Canadian Predictive Methods for a Ring Projector" Proc Undersea Defence Technology 1995, Gallaher, A., Bonin, Y., Favre, M; and "Study of The Axially-Driven Radial Pipe Projector: Verification of MAVART Finite Element Analysis Program", Proc Cansmart 2000, (2000). Fleming, R., Purcell, C.

Some examples of MPS geometries that were modeled are shown in FIG. 1, FIG. 2, and FIG. 3. FEA results were obtained for 2, 4, 6, 8, and 12 benders aligned axially, with centre-to-centre separations of 25 and 50 mm and for 16 benders aligned axially with 25, 50, and 100 mm separations.

The version of MAVART that was used can only analyze axially-symmetric systems so the results presented hereinafter are for axially-symmetric projectors arranged axially. The MPS concept, though, is applicable to any geometry in which the projectors are in near proximity.

Resonance frequency is defined as the frequency of the first peak in the Transmitting Voltage Response, TVR. Q is defined as the resonance frequency divided by the −3 dB bandwidth. The −3 dB bandwidth is defined as the frequency above resonance at which the TVR is 3 dB less than at resonance minus the frequency below resonance at which the TVR is 3 dB less than at resonance.

Figure 13:
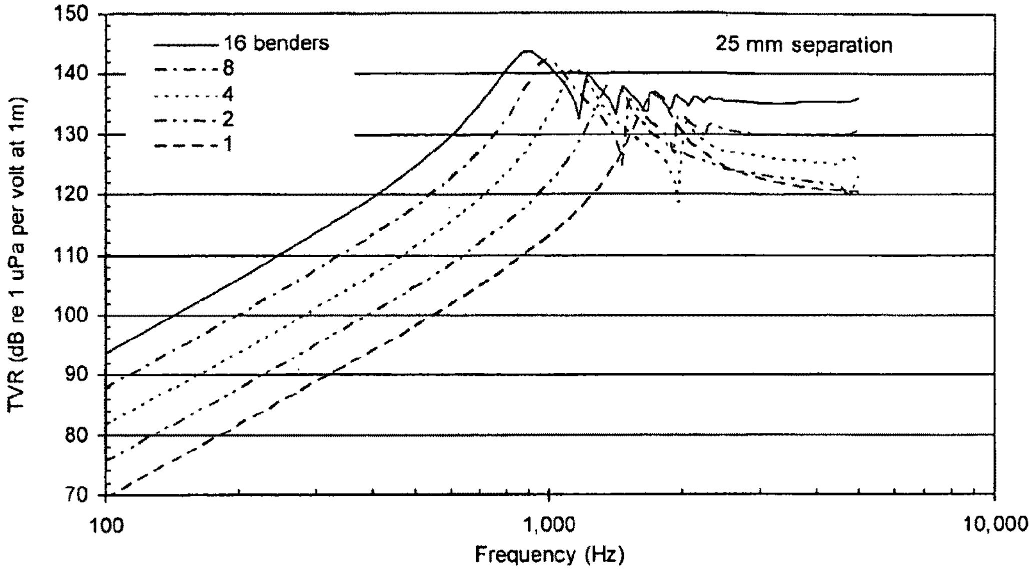
FIG. 13 is a graph showing TVR of 1, 2, 4, 8, and 16 benders with 25 mm center-to-center spacing.
Figure 14:
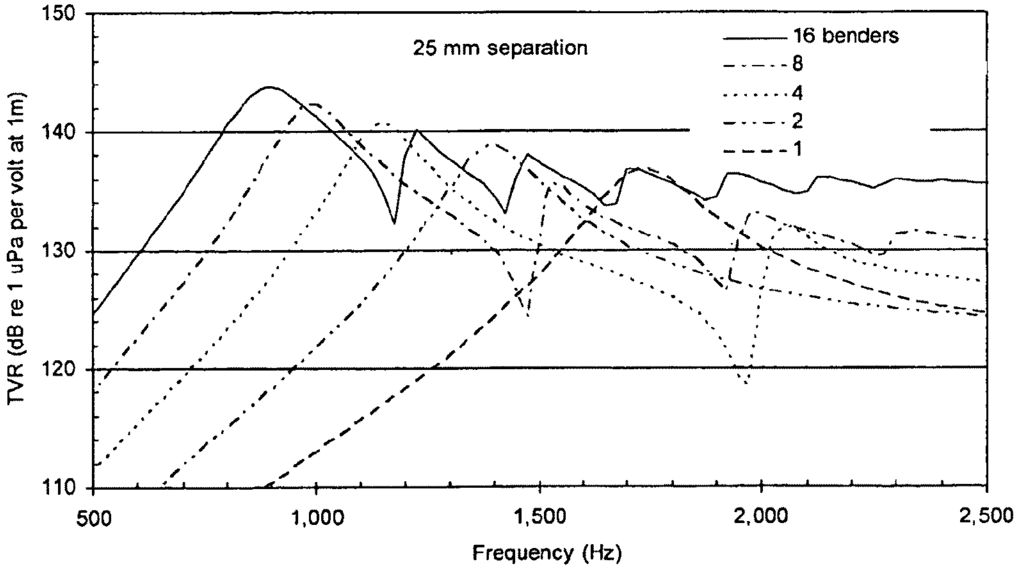
FIG. 14 is a graph showing TVR of 1, 2, 4, 8, and 16 benders with 25 mm center-to-center spacing.
Figure 15:
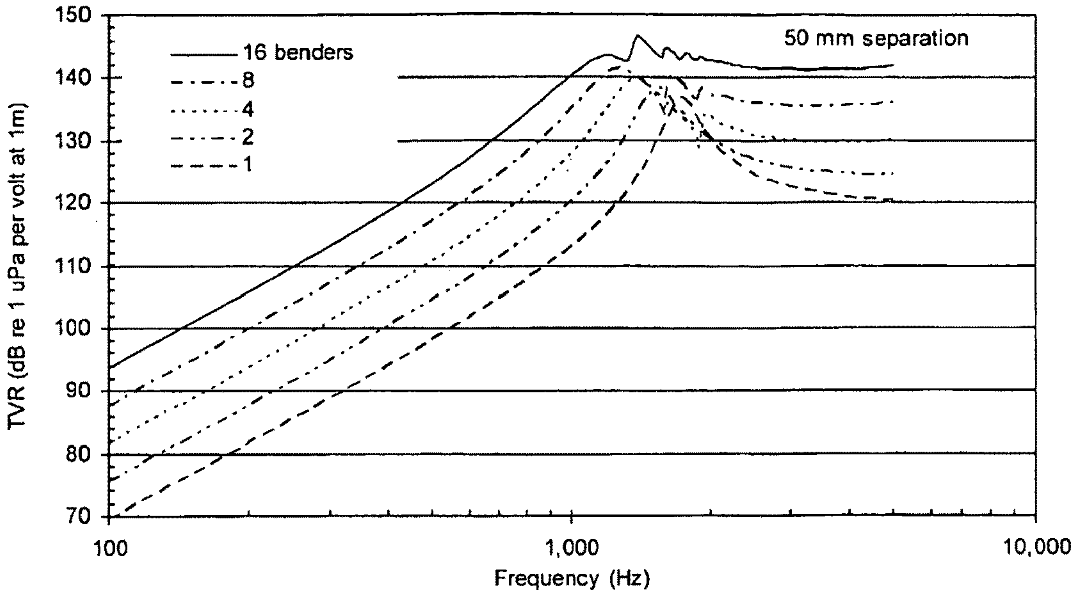
FIG. 15 is a graph showing TVR of 1, 2, 4, 8, and 16 benders with 50 mm center-to-center spacing.
Figure 16:
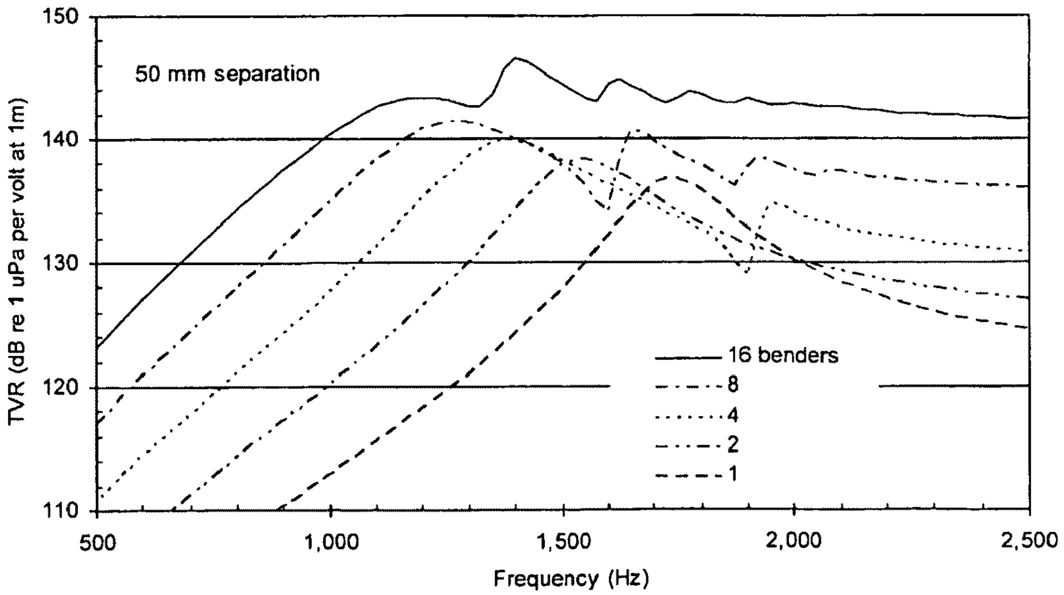
FIG. 16 is a graph showing TVR of 1, 2, 4, 8, and 16 benders with 50 mm center-to-center spacing.
Figure 17:
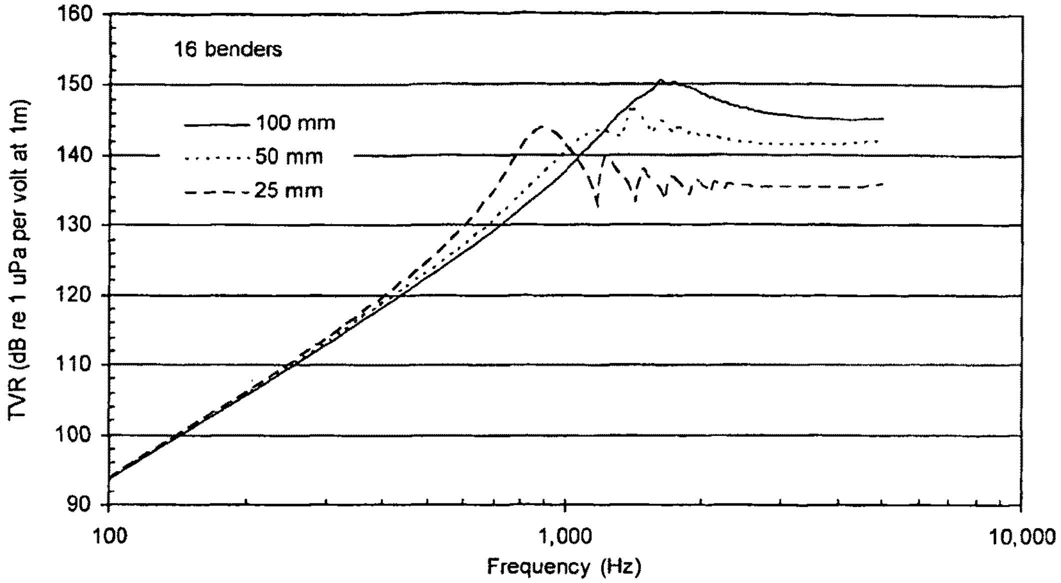
FIG. 17 is a graph showing TVR of 16 benders with 25, 50, and 100 mm center-to-center spacing.

The resonance frequency and bandwidth are described referring to FIGS. 13-17. FIG. 13 and FIG. 14 are plots of Transmitting Voltage Response for a 25 mm centre-to-centre projector separation. FIG. 15 and FIG. 16 are plots of TVR for a 50 mm centre-to-centre projector separation. FIG. 17 is a plot of TVR for 16 projectors with centre-to-centre projector separations of 25, 50, and 100 mm. The units for TVR throughout this disclosure are dB re 1 μPa per volt at 1 m and all TVRs are broadside (90° off the axis of symmetry).

Table 3 tabulates resonance frequency, TVR at resonance, mechanical Q, −3 dB bandwidth, and TVR at 100 Hz for projector separations of 25 mm. Table 4 tabulates the same parameters for 50 mm separation. Table 5 tabulates TVR as a function of frequency for 16 projectors with separations between projectors of 25, 50, and 100 mm. Some of the conclusions that can be drawn from these figures and tables are described below.

TABLE 3

$f_{res}$, bandwidth and TVR with 25 mm spacing

| # benders | $f_{res}$ (Hz) | TVR at $f_{res}$ | Q | −3 dB Bandwidth (Hz) | TVR at 100 Hz |
|---|---|---|---|---|---|
| 1 | 1738 | 136.8 | 7.6 | 228 | 69.4 |
| 2 | 1394 | 138.7 | 7.6 | 187 | 75.5 |

TABLE 3-continued $f_{res}$, bandwidth and TVR with 25 mm spacing

| # benders | $f_{res}$ (Hz) | TVR at $f_{res}$ | Q | −3 dB Bandwidth (Hz) | TVR at 100 Hz |
|---|---|---|---|---|---|
| 4 | 1146 | 140.6 | 6.9 | 166 | 81.5 |
| 6 | 1047 | 141.5 | 6.3 | 167 | 85.1 |
| 8 | 991 | 142.2 | 5.8 | 172 | 87.6 |
| 12 | 930 | 143.1 | 4.8 | 195 | 91.1 |
| 16 | 895 | 143.7 | 4.3 | 210 | 93.6 |

TABLE 4

$f_{res}$, bandwidth and TVR with 50 mm spacing

| # benders | $f_{res}$ (Hz) | TVR at $f_{res}$ | Q | −3 dB Bandwidth (Hz) | TVR at 100 Hz |
|---|---|---|---|---|---|
| 1 | 1738 | 136.8 | 7.6 | 228 | 69.4 |
| 2 | 1544 | 138.4 | 5.7 | 268 | 75.5 |
| 4 | 1381 | 139.8 | 4.3 | 323 | 81.5 |
| 6 | 1310 | 140.7 | 3.6 | 362 | 85.0 |
| 8 | 1265 | 141.4 | 3.3 | 381 | 87.5 |
| 12 | 1220* | 142.4 | 0.9 | Very large | 91.1 |
| 16 | 1200 | 143.4 | | Very large | 93.6 |

TABLE 5

TVR of 16 benders with 25, 50 and 100 mm center-to-center spacing

| Frequency (Hz) | TVR 25 mm spacing | TVR 50 mm spacing | TVR 100 mm spacing |
|---|---|---|---|
| 100 | 93.6 | 93.6 | 93.5 |
| 200 | 106.0 | 105.8 | 105.7 |
| 300 | 113.6 | 113.2 | 113.0 |
| 400 | 119.5 | 118.7 | 118.3 |
| 500 | 124.6 | 123.2 | 122.6 |
| 600 | 129.6 | 127.2 | 126.2 |
| 700 | 134.9 | 130.8 | 129.4 |
| 800 | 140.6 | 134.2 | 132.3 |

The resonance frequency decreases when the number of projectors increases, see FIG. 14, FIG. 16, Table 3, and Table 4. The resonance decreases because each projector partially feels the radiation mass of nearby projectors.

The resonance frequency is least when the projectors are separated least, compare the results in Table 3 and Table 4. This occurs because the radiation mass increases most when the projectors are nearest.

The amplitude of the TVR at resonance increases with the number of projectors, although unlike arrays of projectors in which the projectors are widely separated, the amplitude does not increase 6 dB with a doubling of the number of projectors. At resonance, the vibration amplitude is controlled by the radiation resistance, which, in a MPS, increases with the number of projectors. This increase in radiation resistance increases the bandwidth, but limits the increase in amplitude of the TVR.

At low frequencies, the TVR increases by 6 dB when the number of projectors doubles, see FIG. 13 and FIG. 15. This confirms that the radiation resistance is proportional to the number of projectors. In other words, at frequencies below and near resonance, a MPS behaves like one large projector of equivalent volume velocity. In this frequency range the equivalent circuit provides a qualitative understanding.

At low frequencies, the TVR is independent of the projector spacing, compare FIG. 13 to FIG. 15, and see FIG. 17. This confirms that the radiation resistance continues to be proportional to the number of projectors so long as the system size, d, is such that kd<1. Note that the 16-100 system is nearly 1.6 m long, which corresponds to kd=0.67 at 100 Hz.

For a fixed number of projectors, the ripples in the TVR above resonance have the greatest amplitude when the projectors are closest because the radiation mass is so sharply dependent on projector proximity. Each projector therefore has a different resonance frequency and some plates vibrate out of phase with other plates at frequencies above resonance. This results in destructive acoustic interference.

The magnitude of the ripples in the TVR decreases as the number of projectors increases. This occurs because as the number of projectors increases, the fractional power output of each projector is a smaller part of the total power output. The projectors that produce greater power compensate for the projectors that produce lesser power and with a greater number of projectors, the average power does not change sharply with frequency.

It is possible to reduce the ripple in the TVR above resonance by driving certain groupings of projectors with separate amplifiers so that the phases and amplitudes of the drive signals can vary from one group to the next.

The radiation mass is added. The resonance of the bender is 2600 Hz in air and 1738 Hz by itself in water. From $f_{res} \propto (m_m+m_r)^{1/2}$, it is calculated that for a single projector the radiation mass, $m_r$, is 1.238 times the mechanical mass, $m_m$. To determine how $m_r$ depends on N and the separation amongst projectors, $f_{res}$ can be calculated under the (incorrect) assumption that $m_r \propto N$. Table 6 lists these calculated resonance frequencies and lists again the resonances obtained from the FEA for 25 and 50 mm separations. It is seen that for two projectors separated by 25 mm, each projector does see twice the radiation mass, but for greater numbers of projectors, or greater separations, $m_r$ does not increase linearly with N. Recalling that each projector has a diameter of 106 mm, it is clear from Table 6 that $m_r$ increases most when the projectors are separated by a distance small compared their size, as predicted by the theory.

TABLE 6

Determination of how $m_r$ varies with N and separation

| N | $f_{res}$, calculated, for $m_r \propto N$ | $f_{res}$, FEA, 25 mm separation | $f_{res}$, FEA, 50 mm separation |
|---|---|---|---|
| 2 | 1395 | 1394 | 1544 |
| 4 | 1066 | 1146 | 1381 |
| 8 | 787 | 991 | 1265 |
| 16 | 570 | 895 | 1200 |

The efficiency is described referring to FIGS. 18-23. The measured electroacoustic efficiency, η, of a single bender is 80% to 90% at resonance. This efficiency is typical of well-designed projectors. The FE model efficiency of a single projector was 80% at resonance.

FIG. 18 through FIG. 23 are plots of efficiency versus frequency.

Figure 18:
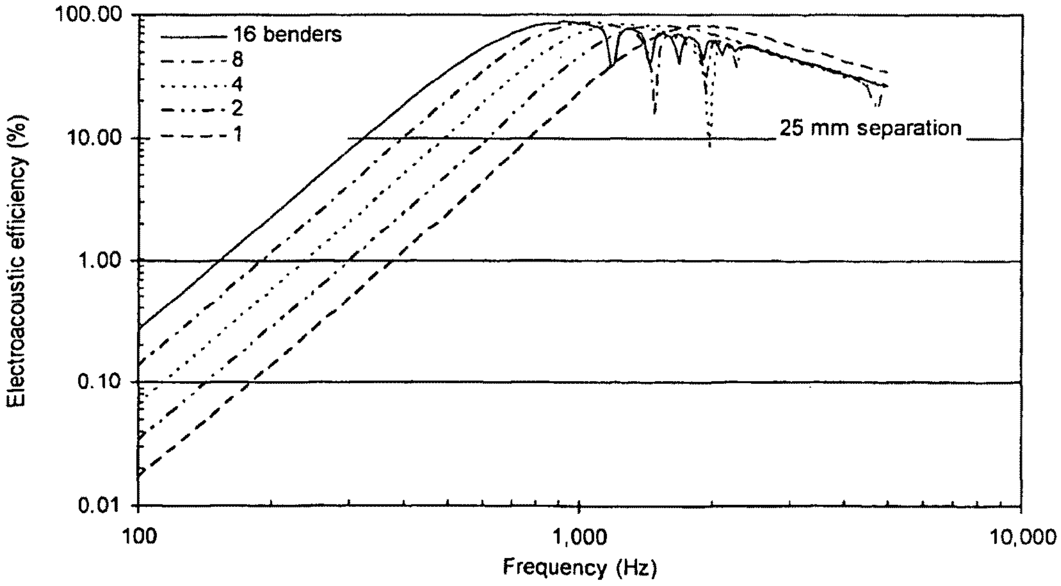
FIG. 18 is a graph showing efficiency of 1, 2, 4, 8, and 16 benders with 25 mm center-to-center spacing.
Figure 20:
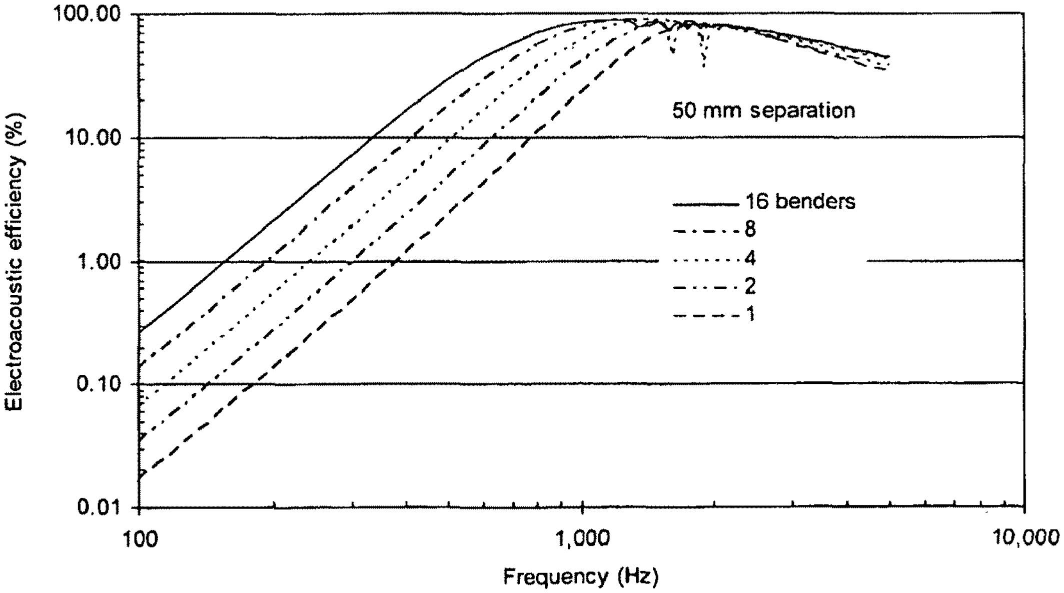
FIG. 20 is a graph showing efficiency of 1, 2, 4, 8, and 16 benders with 50 mm center-to-center spacing.

FIG. 18 and FIG. 20 show that q at low frequency is proportional to the number of projectors. This occurs because $r_r \propto N$ and $\eta \approx r_r/r_m$ when $r_r \ll r_m$, which it is at frequencies far less than resonance.

Figure 19:
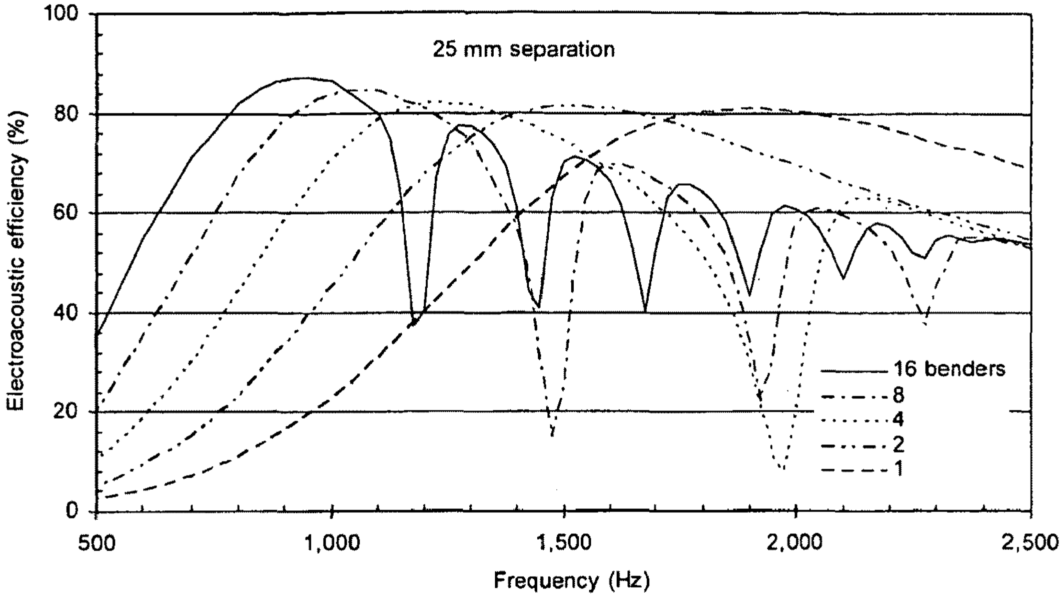
FIG. 19 is a graph showing efficiency of 1, 2, 4, 8, and 16 benders with 25 mm center-to-center spacing.
Figure 21:
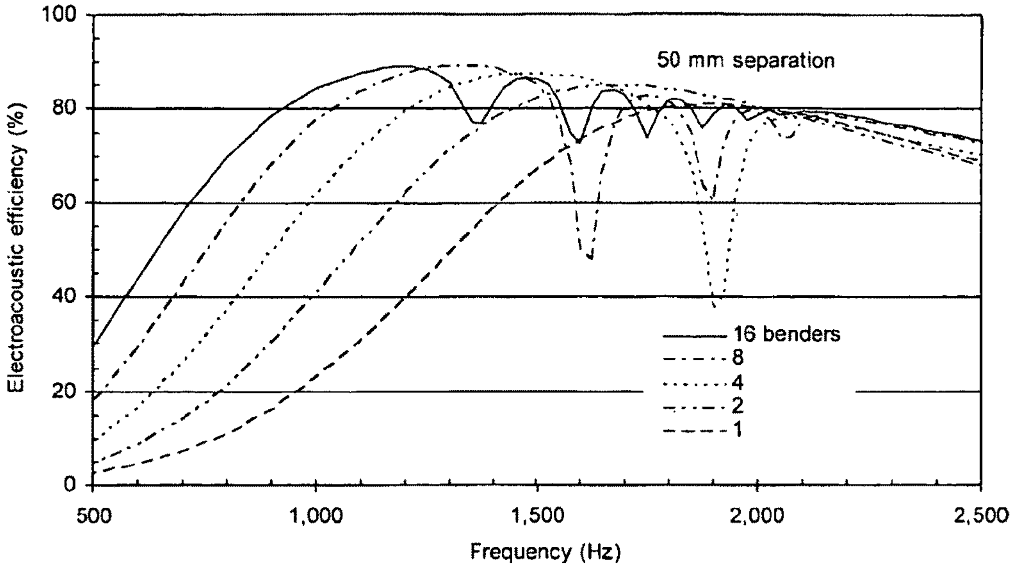
FIG. 21 is a graph showing efficiency of 1, 2, 4, 8, and 16 benders with 50 mm center-to-center spacing.

FIG. 19 and FIG. 21 show that η at resonance gradually increases from 80 to 90% as the number of projectors increases from 1 to 16, showing that a MPS is more efficient than an individual projector of equivalent performance.

Figure 22:
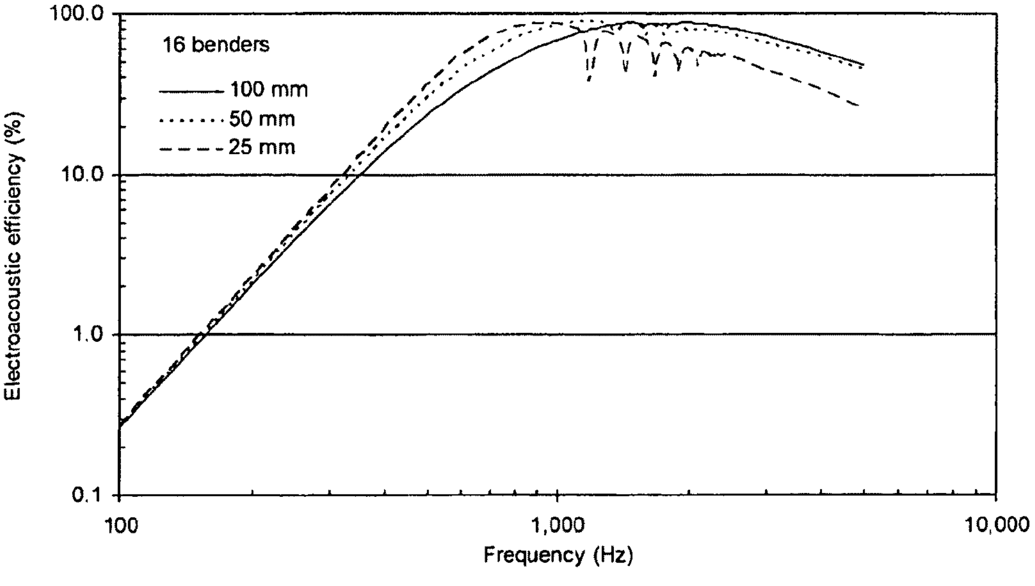
FIG. 22 is a graph showing efficiency of 16 benders with 25, 50, and 100 mm center-to-center spacing.

FIG. 22 and a comparison of FIG. 18 and FIG. 20 show that η is independent of projector spacing so long as $kd \leqq 1$.

Figure 23:
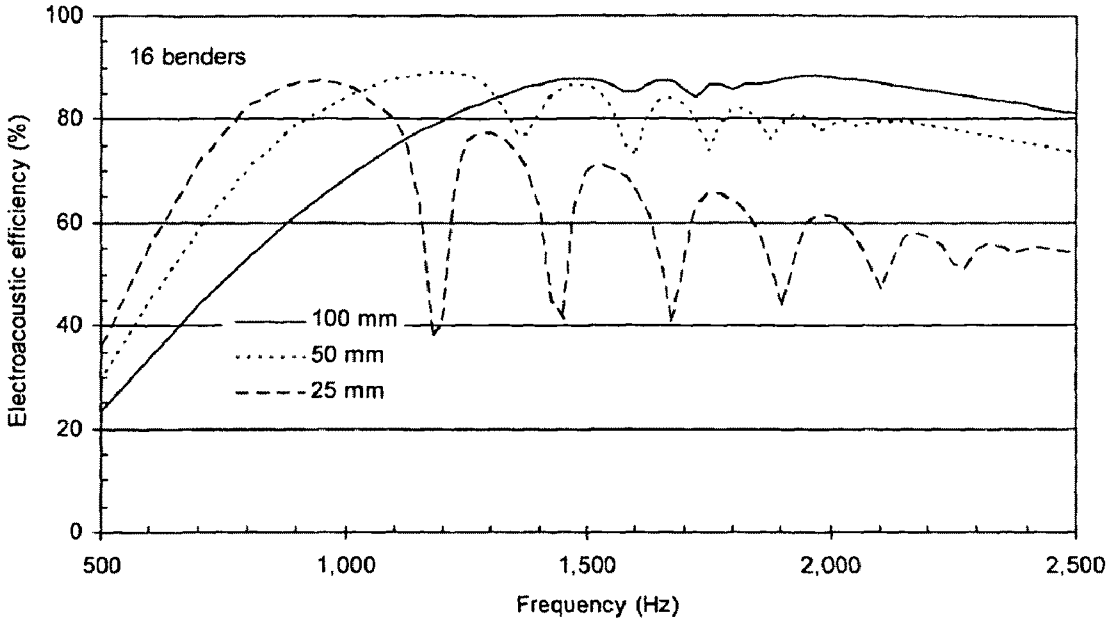
FIG. 23 is a graph showing efficiency of 16 benders with 25, 50, and 100 mm center-to-center spacing.

FIG. 19, FIG. 21, and FIG. 23 show strong dips in efficiency at certain frequencies above resonance. These dips occur because projectors have different resonance frequencies because $m_r$ depends strongly on the number and proximity of nearby projectors. The magnitudes of the dips are greatest when the projector separation is least. The magnitudes of the dips are least when the number of projectors is greatest.

The cavitation depth and sound level are compared between a 4-25 MPS and a 16-50 MPS. Sections hereinbefore showed that the resonance frequency of a MPS is a function of the number of projectors and their spacing. This section compares two MPSs that have similar resonance frequencies, but sharply different cavitation depths, sources levels, and bandwidths. This comparison highlights the design flexibility that a MPS offers.

Cavitation occurs when the peak dynamic pressure exceeds the absolute static pressure. In this situation, the water vaporizes on the negative pressure excursion. The peak acoustic pressure usually occurs on the vibrating surface of a projector so the collapse of the vapor bubbles produced by cavitation can damage a projector in a short time. To avoid cavitation in traditional projector systems, one must either limit the output power, or operate the system at greater depth. In a MPS, though, the system designer can increase the number of projectors in the system, which diminishes the peak pressure on any projector for the same system source level, thereby improving the cavitation depth. With a greater number of projectors, the separation between projectors needs to be greater in order to maintain the same resonance frequency.

As well as producing superior cavitations depths, MPSs with a greater number of projectors also produce greater source levels over greater bandwidths. A comparison of MPSs 4-25 and 16-50, which have similar resonance frequencies, will illustrate the advantages. FIG. 14 and FIG. 16 plot the TVRs of 4-25 and 16-50. The data for the cavitation calculations were obtained from the FEA, which enables one to know acoustic pressures at all locations.

The comparison listed in Table 7 shows that the 16-50 is superior to 4-25. The cavitation depth for each system was calculated for a broadside source level of 201 dB re 1 μPa at 1 m. The bandwidth listed for 4-25 is the −3 dB bandwidth; the bandwidth of 16-50 is harder to define because it depends on what ripple in the TVR is acceptable. The TVR of 16-50 remains between 140.4 and 146.5 from 1000 to 5000 Hz. The source level of each system at resonance is 60 dB greater than the TVR, which corresponds to a 1000 V rms, a conservative voltage for these projectors.

TABLE 2

Comparison of MPSs 4-25 and 16-50

| MPS | $f_{res}$ (Hz) | Cavitation depth for 201 dB at 1 m at 1150 Hz (m) | TVR at $f_{res}$ (dB) | Bandwidth (Hz) | Source level at resonance for 1000 V (dB re 1 μPa at 1 m) |
|---|---|---|---|---|---|
| 4-25 | 1146 | 77.9 | 140.6 | 166 | 200.6 |
| 16-50 | 1200 | 8.8 | 143.4 | 4000 | 203.4 |

Other MPS geometries are now considered. MAVART was limited to analyzing axial symmetric geometries, so all the data presented are for axial symmetric configurations, but the MPS concept applies whenever projectors are in near proximity. This section examines some non-axially symmetric geometries and predicts their performance based on extrapolations from the performance of geometries that were modeled.

FIG. 4 is an isoparametric view of four stacks of 4-25 MPS arranged in a square. As listed in Table 3, one 4-25 stack has a resonance of 1136 Hz, a TVR of 140.1 and a Q of 6.9. Four stacks have a resonance between 700 and 800 Hz (less than a 16-25 because the benders, on average, are closer), a TVR of near 145 dB, and a Q near 4. These estimates can be inferred from the other data in Table 3.

A 19×16-25 MPS is compared to a high-power Ring Shell Projector (34SA350). As shown hereinbefore, in a MPS, there is the flexibility to choose the resonance frequency, bandwidth and cavitation depth. This section compares the depth capability, weight, size, and reliability of a 19×16-25 MPS (304 benders), as shown in FIG. 5, to a large ring-shell projector, RSP, whose details are revealed in U.S. Pat. No. 4,524,693 issued to McMahon et al. on Jun. 25, 1985 and entitled "Underwater transducer with depth compensation".

A particular RSP, model number 34SA350, is a good example of a low-frequency, high-power flextensional projector. It has a diameter of 34", a resonance frequency of 350 Hz and a depth capability of 250 m. To resonate at 350 Hz, the stiffness of the shells is relatively low, which limits the projector's depth to a few tens of metres without pressure compensation. To achieve its 250 m depth capability, the 34SA350 contains an internal bladder, which floods and expands as the projector descends, thereby compressing the internal gas and eliminating the stress due to depth. The resonance of a RSP can be chosen at the time of manufacture by choosing the shell thickness and radius of curvature, but, once chosen, is fixed. The 34SA350 is an excellent projector by any standards, having a source level of 211 dB re 1 μPa, a bandwidth of 75 Hz, and a depth limit of 250 m using only a passive pressure compensation system. Nevertheless, a MSP comprising 304 benders is superior.

With regard to the source level and resonance frequency, without a FEA, one cannot be certain of the performance of a 19×16-25 MPS, but extrapolation from the data for the 16-25 MPS that are listed in Table 3 suggests that the resonance is near 350 Hz with a TVR that exceeds 151 dB re 1 μPa. The benders can be safely driven at 1000 V so the source level of a 19×16-25 MPS exceeds 211 dB re 1 μPa at 1 m. A 19×16-25 MPS contains the same volume of ceramic as a 343SA350 so the extrapolation seems reasonable.

As to the bandwidth, the Q of a single bender, $Q_{one}$, from equation 4 and Table 3 is $$Q_{one} \approx \omega \frac{m_{one}}{R_{one}} = 7.6 \qquad \text{(4 repeat)}$$

The individual values of $m_{one}$ and $R_{one}$ are not known, but from eqn. 4 the ratio, $m_{one}/R_{one}$ is known. It is also known how m and R scale with frequency and number of projectors.

The resonance frequencies of an individual bender and a 19×16-25 MPS are 1738 and 350 Hz respectively. To lower the resonance from 1738 to 350 Hz, the vibrating mass at 350 Hz is a factor of $$\left(\frac{1738}{350}\right)^2 \cong 25$$

greater than $m_{one}$.

The radiation resistance is proportional to the number of benders and inversely proportional to the square of the frequency. Therefore, the radiation resistance felt by a bender in a 19×16-25 MPS is a factor of $$\frac{304}{25} \cong 12$$

greater than $R_{one}$. Therefore, the Q, $Q_{19\times16-25}$, of a 19×16-25 MPS is $$Q_{19\times16-25} \cong \frac{1}{5}\cdot 25\cdot\frac{25}{304}\cdot 7.6 \cong 3.1$$

This corresponds to a −3 dB bandwidth of 350/3.1=113 Hz, whereas the bandwidth of a 34SA350 is 75 Hz.

With regard to the depth capability of a 19×16-25 MPS, the plates of a 1738-Hz bender are relatively stiff and can withstand at least 250 m depth at full drive without pressure compensation. Therefore, the depth capability of any MPS assembled from this bender exceeds 250 m.

With regard to the mass and weight, the mass of each bender, including wires, is 500 grams with an in-water weight of 3000 N (300 grams). The mass of 304 benders is 152 kg, whereas the mass of a 34SA350 is 225 kg. Neither of these masses includes a supporting structure.

With regard to the size, the volume of a cylinder that can contain the 19×16-25 MPS is 88 liters. The volume of a 34SA350 is about 110 liters.

With regard to the reliability and initial cost, the bender is as simple as a projector gets: a pair of ceramics bonded to a pair of aluminum plates that are fastened together along their perimeter. The assembly is encased in potting. The assembly process can be semi-automated and performed reliably by operators with moderate skills and training. The ceramics are thin so 1000 V rms, which presents little potential for arcing, drives the benders to full output. No pressure compensation system is required for depths up to 250 m.

In contrast, there are many different assembly steps in a RSP, few of which are suitable for automation or anything less than a highly-trained operator. The ceramics must be driven with 3500 V rms for full output so there is greater potential for arcing. The internal bladder that provides pressure compensation creates other opportunities for failure.

A MPS allows a simple repair process. If a bender in a MPS stack fails, by arcing say, the repair is as simple as unbolting the stack and replacing it. Each stack could be considered a throw-away part. In contrast, in a single-projector system, the projector must be sent back to the manufacturer for an expensive repair, should such a repair be possible.

With regard to the stability of acoustic performance with depth, due to the low compliance of the shells in a 34SA350, the internal gas provides a significant fraction of the restoring force when the projector approaches its full depth of 250 m. This results in performance that varies with depth. The performance of the bender varies little with depths up to 250 m.

The MPS approach allows adjustment of the resonance frequency. The resonance frequency of a 19×16-25 MPS is 350 Hz when the stacks are packed as tightly as possible. As the separation between stacks increases, the resonance gradually rises to that of an individual stack, which is 895 Hz as listed in Table 3. The resonance can also be increased by increasing the separation between benders in a stack. By these means, the resonance can be adjusted.

Table 8 lists the above comparisons.

TABLE 8

Comparison of 19 × 16-25 MPS with 34SA350 RSP

| | 19 × 16-25 MPS | 34SA350 |
|---|---|---|
| Uncompensated depth limit (m) | >250 m | 30 to 40 |
| Depth limit with internal bladder (m) | NA | 250 |
| Performance variation with depth | Little | Some |
| Mass, not including support structure (kg) | 152 | 225 |
| Volume (litre) | 88 | 110 |
| Reliability | High | Less |
| Ease of repair | High | Low |
| Cost of repair | Low | High |
| Source level at 350 Hz (dB re 1 μPa at 1 m) | >211 | 211 |
| −3 dB bandwidth (Hz) | 113 | 75 |
| Resonance frequency (Hz) | 350 and up | 350 |

A 37×30-25 MPS provides a high power at low frequencies. FIG. 6 shows an example of a large MPS comprising 1,110 benders, the 37×30-25 MPS. This MPS has a resonance frequency of about 250 Hz and can conservatively produce a source level of 215 dB re 1 μPa at 1 m at resonance and 194 dB at 100 Hz. This projector with mounting hardware has a mass of 650 kg.

Prior-art projectors designed to operate at these low frequencies are heavier, complicated, expensive, and usually require depth compensation, for example, see U.S. Pat. No. 4,529,906 issued to McMahon on Jul. 16, 1985 and entitled "Moving Coil Linear Actuator".

Benders with higher and lower resonance frequencies can be used. The examples of MPSs presented herein have resonance frequencies ranging from 250 to 1,620 Hz using a bender with a resonance of 1738 Hz. Those skilled in the art of projector design will know that the resonance of a bender can easily be changed by changing appropriately the diameter, plate thickness, and ceramic thickness.

If a MPS employed a bender with a resonance frequency of 870 Hz, then a MPS with 1110 benders resonates near 125 Hz and have a source level exceeding 211 dB re 1 μPa at 1 m. Its mass and size can be made similar to the 37×30-25 MPS shown in FIG. 6, although its depth capability is about half as great unless pressure compensation were used.

Similarly, the resonance frequency of a bender can be increased. MPSs comprising such benders have resonances proportionally higher.

By these means, it is clear that with two or three bender designs with different resonance frequencies, it is possible to produce MPSs whose resonance frequencies can span more than a decade.

While particular embodiments of the present invention have been shown and described, changes and modifications may be made to such embodiments without departing from the scope of the invention.

What is claimed is:

1. A method for producing an underwater sound projector system, the method comprising the steps of:

providing multiple sound projectors, each sound projector being capable of producing acoustic pressures and having a fundamental resonance frequency; and holding the sound projectors in close proximity such that the sound projectors interact with one another via the acoustic pressures that the projectors produce, wherein the sound projectors are held so that a separation between a sound projector and its nearest neighboring sound projector is less than or equal to a characteristic size of the sound projector, and the separation measured in wavelengths is equal to or less than λ/8, wherein λ is a wavelength of an acoustic wave at a fundamental resonance frequency of the sound projector system, and wherein the sound projectors are held such that the fundamental resonance frequency of the sound projector system is about 80% or lower of the fundamental resonance frequency of each sound projectors when measured in a free field.

2. The method as claimed in claim 1, wherein

The holding step holds the sound projectors in close proximity to increase the radiation impedance felt by each sound projector.

3. The method as claimed in claim 1, wherein the holding step holds the sound projectors in places determined by target performance parameters, the target performance parameters including a resonance frequency, source level, cavitation depth, electroacoustic efficiency and/or bandwidth.

4. The method as claimed in claim 1, wherein the providing step comprises the step of determining a number of the sound projectors based on one or more target performance parameters; and the holding step holds the determined number of sound projectors in close proximity.

5. The method as claimed in claim 4, further comprising the step of:

altering the number of sound projectors based on a different target parameter.

6. The method as claimed in claim 1, wherein the providing step comprises the step of determining a distance between the sound projectors based on one or more target performance parameters; and the holding step holds the sound projectors separated by the determined distance therebetween.

7. The method as claimed in claim 6, further comprising the step of:

altering the distance between the sound projectors based on a different target parameter.

8. The method as claimed in claim 1, wherein the holding step holds some or all of the sound projectors into one or more stacks.

9. The method as claimed in claim 8, wherein the holding step holds some or all of the sound projectors into one or more stacks in axial alignment.

10. The method as claimed in claim 8, wherein

The holding step holds the stacks in close proximity such that the sound projectors of the stacks interact with one another via the acoustic pressures that the projectors produce.

11. An underwater sound projector system comprising:

multiple sound projectors, each sound projector being capable of producing acoustic pressures and having a fundamental resonance frequency; and a holder that holds the sound projectors in close proximity such that the sound projectors interact with one another via the acoustic pressures that the projectors produce, wherein the sound projectors are held so that a separation between a sound projector and its nearest neighbouring sound projector is less than or equal to a characteristic size of the sound projector, and the separation measured in wavelengths is equal to or less than λ/8, wherein λ is a wavelength of an acoustic wave at a fundamental resonance frequency of the sound projector system, and wherein the sound projectors are held such that the fundamental resonance frequency of the sound projector system is about 80% or lower of the fundamental resonance frequency of each sound projectors when measured in a free field.

12. The underwater sound projector system as recited in claim wherein each sound projector is a flexural plate projector comprising:

a bending assembly having two bending members capable of vibrating when the bending members are subjected to an alternating voltage, the bending members being held together with a gap therebetween to permit vibration of the bending members;

a flexible case for encasing the bending assembly to electrically insulate the betiding assembly from water, the flexible case allowing vibration of the bending members; and electrical members connected to the bending members for providing alternating voltages.

13. The underwater sound projector system as recited in claim 12, wherein each of the bending members comprises a piezoelectric ceramic plate affixed to a metal plate; and the electrical members include a first electrical wire connected to the metal plate, and a second electrical wire connected to the ceramic plate.

14. The underwater sound projector system as recited in claim 11, wherein the holder that holds the sound projectors in place based on target performance parameters, the target performance parameters including a resonance frequency, source level, cavitation depth, electroacoustic efficiency and/or bandwidth.

15. The underwater sound projector system as recited in claim 11, wherein the holder that holds the sound projectors in close proximity to increase a radiation impedance felt by each sound projector.

16. The underwater sound projector system as recited in claim 11, wherein the multiple sound projectors include a predetermined number of the sound projectors, the predetermined number being determined based on one or more target performance parameters.

17. The underwater sound projector system as recited in claim 11, wherein the holder separates the sound projectors by a predetermined distance therebetween, the predetermined distance being determined based on one or more target performance parameters.

18. The underwater sound projector system as recited in claim 11, wherein the holder includes one or more spacers for separating the sound projectors.

19. The underwater sound projector system as recited in claim 18, wherein the spacers allow some or all of the sound projectors to be arranged into one or more stacks.

20. The underwater sound projector system as recited in claim 18, wherein the spacers allow some or all of the sound projectors arranged into one or more stacks in axial alignment.

21. The underwater sound projector system as recited in claim 19, wherein the holder includes a frame for holding the stacks of sound projectors in close proximity such that the sound projectors of the stacks interact with one another via the acoustic pressures that the projectors produce.

22. The underwater sound projector system as recited in claim 11, wherein each of the multiple sound projectors comprises a bending assembly having two bending members capable of vibrating when the bending members are subjected to an alternating voltage, the bending members being held together with a gap therebetween to permit vibration of the bending members; and the underwater sound projector further comprises:

a flexible container for containing the multiple sound projectors;

an electrically insulating fluid contained in the flexible container; and wherein the multiple sound projectors are immersed in the electrically insulating fluid in the flexible container.

23. The method as recited in claim 1, wherein the providing step provides the multiple sound projectors, each multiple sound projector being encased in a flexible case.

24. The method as recited in claim 1 further comprising the step of:

encasing the multiple sound projectors in a flexible container containing an electrically insulating fluid.

25. The method as recited in claim 1, wherein the providing step provides the multiple sound projectors, one or more of the sound projectors having a predetermined resonance frequency; and the holding step holds the sound projectors such that the underwater sound projector system has a lower resonance frequency than the predetermined resonance frequency.

26. The underwater sound projector system as recited in claim 11, wherein one or more of the sound projectors have a predetermined resonance frequency; and the underwater sound projector system has a lower resonance frequency than the predetermined resonance frequency.

27. The method as recited in claim 25, wherein the providing step provides the multiple sound projectors, the one or more of the sound projectors having a predetermined transmitting voltage response at the predetermined resonance frequency; and the holding step holds the sound projectors such that the underwater sound projector system has a higher transmitting voltage response than the predetermined transmitting voltage response at the lower resonance frequency.

28. The underwater sound projector system as recited in claim 26, wherein the one or more of the sound projectors have a predetermined transmitting voltage response at the predetermined resonance frequency; and the underwater sound projector system has a higher transmitting voltage response than the predetermined transmitting voltage response at the lower resonance frequency.

29. The method as recited in claim 1, wherein the providing step provides the multiple sound projectors, one or more of the sound projector having a predetermined bandwidth; and the holding step holds the sound projectors such that the underwater sound projector system has a greater bandwidth than the predetermined bandwidth.

30. The underwater sound projector system as recited in claim 11, wherein one or more of the sound projectors have a predetermined bandwidth; and the underwater sound projector system has a greater bandwidth than the predetermined bandwidth.

31. The method as recited in claim 1, wherein the providing step provides the multiple sound projectors, one or more of the sound projector having predetermined efficiency; and the holding step holds the sound projectors such that the underwater sound projector system has greater efficiency than the predetermined efficiency at and below a resonance frequency of the underwater sound projector system and at most frequencies above the resonance frequency.

32. The underwater sound projector system as recited in claim 11, wherein one or more of the sound projectors have predetermined efficiency; and the underwater sound projector system has greater efficiency than the predetermined efficiency at and below a resonance frequency of the underwater sound projector system and at most frequencies above the resonance frequency.

33. The method as recited in claim 1, wherein the holding step holds the sound projectors such that the underwater sound projector system has a predetermined cavitation depth.

34. The underwater sound projector system as recited in claim 11, wherein the underwater sound projector system has a predetermined cavitation depth.

* * * * *

UNITED STATES PATENT AND TRADEMARK OFFICE

CERTIFICATE OF CORRECTION

PATENT NO. : 8,139,443 B2
APPLICATION NO. : 11/794771
DATED : March 20, 2012
INVENTOR(S) : Bruce Allan Armstrong It is certified that error appears in the above-identified patent and that said Letters Patent is hereby corrected as shown below:

IN THE SPECIFICATIONS:

column 6, line 47, “radius α” should be --radius a--
column 6, line 51, in the equation, “2kα” (two occurrences) should be --2k*a*--, the correct equation is $$Z_r = \rho_o c S[R_1(2ka) + X_1(2ka)]$$

column 6, line 52, “S=πα2” should be --S=πa2--
column 7, line 15, “kα” should be --ka--
column 7, line 55, “TABLE 1” should be --TABLE 2--
column 10, line 58, “q” should be --η--
column 11, line 50, “TABLE 2” should be --TABLE 7--

IN THE CLAIMS:

column 15, claim 2, line 2, “The” should be --the--
column 15, claim 10, line 2, “The” should be --the--
column 16, claim 12, line 2, “claim wherein” should be --claim 11, wherein--
column 16, claim 12, line 11, “the betiding” should be --the bending--

Signed and Sealed this
Third Day of July, 2012

David J. Kappos
*Director of the United States Patent and Trademark Office*

UNITED STATES PATENT AND TRADEMARK OFFICE

CERTIFICATE OF CORRECTION

PATENT NO. : 8,139,443 B2
APPLICATION NO. : 11/794771
DATED : March 20, 2012
INVENTOR(S) : Bruce Allan Armstrong It is certified that error appears in the above-identified patent and that said Letters Patent is hereby corrected as shown below:

IN THE SPECIFICATIONS:

column 6, line 47, “radius α” should be --radius a--
column 6, line 51, in the equation, “2kα” (two occurrences) should be --2k*a*--, the correct equation is $$Z_r = \rho_o c S\left[R_1(2ka) + X_1(2ka)\right]$$

column 6, line 52, “S=πα2” should be --S=πa2--
column 7, line 15, “kα” should be --ka--
column 7, line 55, “TABLE 1” should be --TABLE 2--
column 10, line 58, “q” should be --η--
column 11, line 50, “TABLE 2” should be --TABLE 7--

IN THE CLAIMS:

column 15, line 2 (claim 2, line 2) “The” should be --the--
column 15, line 48 (claim 10, line 2) “The” should be --the--
column 16, line 5 (claim 12, line 2) “claim wherein” should be --claim 11, wherein--
column 16, line 15 (claim 12, line 11) “the betiding” should be --the bending--

This certificate supersedes the Certificate of Correction issued July 3, 2012.

Signed and Sealed this
Fourteenth Day of August, 2012

David J. Kappos
*Director of the United States Patent and Trademark Office*